United States Patent
Yu et al.

(10) Patent No.: US 11,899,616 B2
(45) Date of Patent: Feb. 13, 2024

(54) SYSTOLIC ARRAY-BASED DATA PROCESSING METHOD AND APPARATUS, MEDIUM, AND PROGRAM PRODUCT

(71) Applicant: Tencent Technology (Shenzhen) Company Limited, Shenzhen (CN)

(72) Inventors: Xiaoyu Yu, Shenzhen (CN); Dewei Chen, Shenzhen (CN); Heng Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/986,727

(22) Filed: Nov. 14, 2022

(65) Prior Publication Data

US 2023/0070177 A1 Mar. 9, 2023

Related U.S. Application Data

(63) Continuation of application No. PCT/CN2022/077046, filed on Feb. 21, 2022.

(30) Foreign Application Priority Data

Feb. 26, 2021 (CN) .......................... 202110219814.4

(51) Int. Cl.
*G06F 15/80* (2006.01)
*G06F 9/54* (2006.01)

(52) U.S. Cl.
CPC .......... *G06F 15/8046* (2013.01); *G06F 9/544* (2013.01)

(58) Field of Classification Search
CPC ...... G06F 15/8046; G06F 9/544; G06F 30/27; G06N 3/063
See application file for complete search history.

(56) References Cited

U.S. PATENT DOCUMENTS

| 2018/0165574 A1* | 6/2018 | Young | G06F 7/5443 |
| 2020/0175355 A1* | 6/2020 | Chung | G06F 15/8046 |

(Continued)

FOREIGN PATENT DOCUMENTS

| CN | 109871951 A | 6/2019 |
| CN | 110543934 A | 12/2019 |

(Continued)

OTHER PUBLICATIONS

Tencent Technology, WO, PCT/CN2022/077046, Apr. 28, 2022, 5 pgs.

(Continued)

*Primary Examiner* — Farley Abad
(74) *Attorney, Agent, or Firm* — Morgan, Lewis & Bockius LLP

(57) ABSTRACT

The present disclosure provides a systolic array-based data processing method that includes determining an input splice quantity for the systolic array based on a target input depth and a standard input depth, and determining an output splice quantity for the systolic array based on a target output depth and a standard output depth; inputting the input data matching the input splice quantity to an input buffer of the systolic array in batches, without overlaps in the input data, and processing, by the systolic array, the input data in the input buffer to generate output data corresponding to each piece of input data; and in accordance with a determination that a quantity of output data received by an output buffer of the systolic array from the systolic array matches the output splice quantity, outputting, in the output buffer, output data having a quantity matching the output splice quantity in batches.

20 Claims, 18 Drawing Sheets

(56) References Cited

U.S. PATENT DOCUMENTS

2021/0125097 A1* 4/2021 Ozer ............... G06F 18/214
2021/0334142 A1* 10/2021 Wang ............... G06F 15/8046

FOREIGN PATENT DOCUMENTS

CN        111506344 A    8/2020
CN        113705069 A    11/2021

OTHER PUBLICATIONS

Tencent Technology, IPRP, PCT/CN2022/077046, Aug. 29, 2023, 6 pgs.
Tencent Technology, ISR, PCT/CN2022/077046, Apr. 28, 2022, 2 pgs.

* cited by examiner

SYSTOLIC ARRAY-BASED DATA PROCESSING METHOD AND APPARATUS, MEDIUM, AND PROGRAM PRODUCT

CROSS-REFERENCE TO RELATED APPLICATIONS

This application is a continuation application of PCT Patent Application No. PCT/CN2022/077046, entitled "PULSATION ARRAY-BASED DATA PROCESSING METHODS, DEVICES, MEDIA AND PROGRAM PRODUCTS" filed on Feb. 21, 2022, which claims priority to Chinese Patent Application No. 202110219814.4, filed with the State Intellectual Property Office of the People's Republic of China on Feb. 26, 2021, and entitled "CALCULATION OPTIMIZATION METHOD AND APPARATUS OF SHALLOW DEPTH MODEL BASED ON SYSTOLIC ARRAY", all of which are incorporated herein by reference in their entirety.

FIELD OF THE TECHNOLOGY

The present disclosure relates to the computer field, and more specifically, to a systolic array-based data processing method and apparatus, a medium, and a program product.

BACKGROUND OF THE DISCLOSURE

In the data processing field, many data processing processes, such as a deep learning process, may be performed by using a convolutional neural network (CNN), and a large number of calculation steps need to be performed, most of which are multiply-accumulate operations.

Currently, a systolic array structure has been used for implementing a large number of multiply-accumulate operation processes. The systolic array structure includes calculation units (denoted as PEs, each PE including a multiplier-accumulator or a similar calculation device, and/or a storage unit) disposed at nodes of each row and each column. An advantage lies in that an operand or an intermediate result participating in an internal operation can participate in a high-speed parallel pipeline manner, that is, simple and efficient systolic transfer can be implemented for each piece of input data (data inputted to each row) and a calculation result of each PE in the entire array, thereby improving data reuse, reducing off-chip data transfer, and reducing a bandwidth requirement. Therefore, one or more two-dimensional systolic arrays are widely used in artificial intelligence (AI) processors as a calculation core for multiply-accumulate operations, for example, a TPU.

SUMMARY

To resolve the foregoing problems, embodiments of the present disclosure provide a systolic array-based data processing method and apparatus, a medium, and a program product.

According to an aspect of the present disclosure, a systolic array-based data processing method is provided, including: determining a standard input depth and a standard output depth of a systolic array, and determining a target input depth and a target output depth of a shallow depth model; determining an input splice quantity for the systolic array based on the target input depth and the standard input depth, and determining an output splice quantity for the systolic array based on the target output depth and the standard output depth; generating input data matching the input splice quantity, each piece of input data having the target input depth, inputting the input data matching the input splice quantity to an input buffer of the systolic array in batches without overlaps in the input data, and processing, by the systolic array, the input data in the input buffer to generate output data corresponding to each piece of input data, each piece of output data having the target output depth; and in accordance with a determination that a quantity of output data received by an output buffer of the systolic array from the systolic array matches the output splice quantity, outputting, in the output buffer, the output splice quantity in batches.

According to another aspect of the present disclosure, a calculation apparatus is provided, and the calculation apparatus may include: a controller, a data fetcher, a systolic array, an input buffer, and an output buffer; the controller determining a standard input depth and a standard output depth of the systolic array, and determining a target input depth and a target output depth of a shallow depth model; the controller determining an input splice quantity for the systolic array based on the target input depth and the standard input depth, and determining an output splice quantity for the systolic array based on the target output depth and the standard output depth; and the controller controlling the data fetcher to obtain and generate input data matching the input splice quantity, and input the input data matching the input splice quantity to the input buffer of the systolic array in batches without overlaps in the input data, each piece of input data having the target input depth, and controlling the systolic array to process the input data in the input buffer to generate output data corresponding to each piece of input data, each piece of output data having the target output depth; and in accordance with a determination that a quantity of output data received by the output buffer of the systolic array from the systolic array reaches the output splice quantity, controlling the output buffer to output the output data matching the output splice quantity in batches.

According to still another aspect of the present disclosure, a computer-readable storage medium is further provided, storing an instruction or code, the instruction or code, when executed by a processor, implementing the foregoing operations performed by the controller in the calculation apparatus.

According to still another aspect of the present disclosure, a computer program product is further provided, having an instruction or code, the data processing method above being implemented in accordance with a determination that the instruction or the code is executed by a calculation apparatus.

BRIEF DESCRIPTION OF THE DRAWINGS

To describe the technical solutions of the embodiments of the present disclosure more clearly, the following briefly introduces the accompanying drawings required for describing the embodiments. The accompanying drawings described below are only some exemplary embodiments of this application.

DESCRIPTION OF EMBODIMENTS

Figure 1:
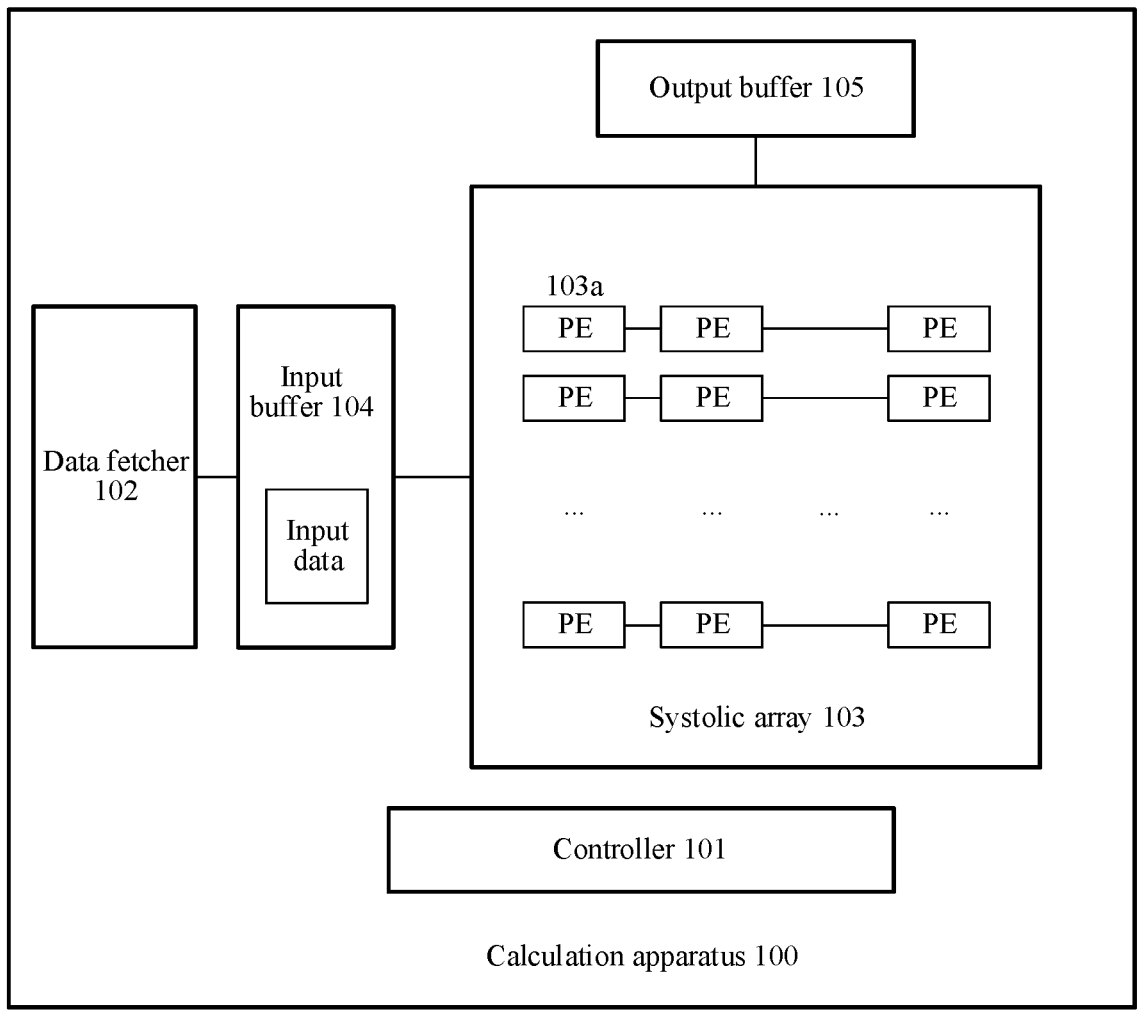
FIG. 1 is a schematic structural diagram of a systolic array-based calculation apparatus according to an embodiment of the present disclosure.

To make the objectives, technical solutions, and advantages of the present disclosure more obvious, exemplary embodiments of the present disclosure are described in detail below with reference to the accompanying drawings. Apparently, the described embodiments are merely some but not all of the embodiments of this application. It is to be understood that, this application is not limited by the exemplary embodiments described herein.

In this specification and the drawings, substantially the same or similar steps and elements are denoted by the same or similar reference numerals, and repeated descriptions of these steps and elements are omitted. In addition, in the description of the present disclosure, the terms "first", "second" and the like are used only to distinguish descriptions and are not to be construed as indicating or implying relative importance or sorting.

Deep learning (also referred to as deep structured learning or hierarchical learning) is a part of a more extensive family of machine learning methods based on an artificial neural network. Learning may be supervised, semi-supervised, or unsupervised.

As described above, data processing in deep learning may be performed, for example, by using a convolutional neural network (CNN). The convolutional neural network (CNN) mainly includes an input layer, a convolutional layer, an activation function, a pooling layer, a fully connected layer, and a loss function, and there may be a plurality of intermediate layers (for example, convolutional layers and pooling layers). A large number of multiply-accumulate operations of data are involved in calculation at the convolutional layer. Therefore, a systolic array structure may be used for implementing a calculation process at the convolutional layer. Although an example in which the systolic array structure is applied to the calculation at the convolutional layer is used in the context of the present disclosure for description, the systolic array structure may be alternatively applied to calculation of any matrix.

Before embodiments of the present disclosure are described in detail, some terms used in this specification are briefly described.

Shallow depth model: a lightweight model used in deep learning for generating output data based on input data, depths of the input data and the output data being generally small. A calculation process of the shallow depth model is implemented based on a systolic array described below.

Systolic array: A systolic array has a plurality of calculation units arranged in rows and columns. A calculation unit includes a calculation element such as a multiply-accumulate unit (for example, implemented by a multiplier-accumulator), to perform matrix multiplication as a basic calculation unit of a neural network. The calculation units are connected to each other through wires. After necessary buffers are integrated in the calculation units, the buffers are connected to buffers outside the calculation units. A systolic matrix is named after a systolic function of a heart: Like blood flow, data is "pumped" by the calculation units.

FIG. 1 is a schematic structural diagram of a systolic array-based calculation apparatus 100 according to an embodiment of the present disclosure.

As shown in FIG. 1, the calculation apparatus 100 includes: a controller 101, a data fetcher 102, a systolic array 103, an input buffer 104, and an output buffer 105.

In this embodiment of the present disclosure, for ease of description, only one controller 101 is shown in FIG. 1, but a person skilled in the art is to understand that the controller may be a general term for a plurality of control modules that cooperate with each other to control all operations of the calculation apparatus 100. The controller 101 herein may be one or more of a global controller for global control, various types of control logic or control circuits for controlling operations of the data fetcher, the input buffer, and the output buffer, and the like; or may be a combination of multiplier-accumulators in calculation units. For example, the global controller may be configured with, for example, instruction parsing and parameter configuration functions, to provide operating parameters for the data fetcher 102, the input buffer 104, the output buffer 105, and the like. Control logic corresponding to the input buffer 104 may control transmission of buffered input data to the systolic array 103. Control logic corresponding to the output buffer may control buffering of output data of the systolic array 103 to the output buffer, and output the output data from the output buffer.

The systolic array 103 may be a calculation unit array (also used interchangeably with the systolic array in the following descriptions), and may have a standard input depth and a standard output depth. A quantity of rows and a quantity of columns of the calculation unit array correspond to the standard input depth and the standard output depth respectively. In other words, the standard input depth is the quantity of rows of the calculation unit array, and the standard output depth is the quantity of columns of the calculation unit array. In some embodiments, the quantity of rows and the quantity of columns of the calculation unit array may be equal to the standard input depth and the standard output depth may respectively. In some other embodiments, the quantity of rows and the quantity of columns of the calculation unit array may be greater than the standard input depth and the standard output depth respectively, so that calculation units in some rows and columns serve as alternatives or redundancy. This is not limited in the present disclosure. In different cases, the standard input depth and the standard output depth of the calculation unit array may be different. For example, for different types of AI processors including calculation unit arrays, calculation unit arrays 16×32, 32×32, and the like may be selected.

The calculation unit array (systolic array) 103 may include at least one row of calculation units, each row of calculation units includes at least two calculation units 103a, and two adjacent calculation units 103a in each row of calculation units are connected.

The input buffer 104 buffers at least one piece of input data that comes from the data fetcher 102 and that requires calculation by the systolic array. The input buffer 104 may also buffer calculation parameters used for calculation. The calculation parameters may be provided by the data fetcher 102 directly to the systolic array 103 or provided to the systolic array 103 through the input buffer 104. Each piece of input data may also have a depth (which may be considered as including a plurality of pieces of input data or multi-channel input data). In addition, the input buffer 104 may include a plurality (for example, equal to the quantity of rows of the systolic array) of input sub-buffers (not shown), and each input sub-buffer is configured to provide a piece of input data to calculation units in a row of the systolic array. For example, in accordance with a determination that a depth of specific input data is m (m is an integer greater than or equal to 1), the input data may be considered as including m pieces of input data or input data of m channels, and the m pieces of input data are buffered to the m input sub-buffers respectively according to an input format and a time sequence required for the systolic array, so that the m input sub-buffers input the m pieces of input data to m rows of the systolic array respectively according to the time sequence of the systolic array.

The controller 101 (for example, control logic corresponding to the input buffer 104) may control input of input data in the input buffer 104 to a calculation unit 103$a$ in a corresponding row, and a calculation unit 103$a$ in each row transmits each piece of received input data in the calculation unit 103$a$ in the corresponding row. For example, in accordance with a determination that a calculation unit 103$a$ in the first column of the first row receives a piece of input data from the first input sub-buffer, the calculation unit transfers the input data to a calculation unit in the second column of the first row, and the input data is sequentially transferred in a systolic manner. A difference between times at which first calculation units 103$a$ in adjacent rows each receive a piece of input data in the input data is one clock.

Each calculation unit 103$a$ in the systolic array 103 is configured to calculate a piece of received input data and a corresponding calculation parameter (for example, a weight coefficient of a convolution kernel in a CNN model). For each column of the systolic array 103, calculation results of all calculation units 103$a$ in the column are superposed (that is, accumulated for summation) (from bottom to top in the figure), and output data is obtained at the last calculation unit 103$a$ in each column (the $m^{th}$ row of each column), so that the output data of the column is outputted to the output buffer 105. The calculation parameter may be updated as needed, provided that the calculation parameter can be used by a corresponding calculation unit in accordance with a determination that each calculation unit of the systolic array performs a calculation task. For example, according to a setting manner of the systolic array, for calculation of each piece of input data, a calculation parameter at each calculation unit may be prestored on the calculation unit, or may be transferred to each calculation unit in a systolic manner during calculation according to a clock the same as that of systolic transfer of input data and according to a direction different from that of systolic transfer of input data (the directions being perpendicular). This is the same as a general principle of the systolic array.

Likewise, the output buffer 105 may include a plurality of output sub-buffers, configured to buffer output data outputted by the last calculation unit 103$a$ in each column. The controller 101 (for example, the control logic corresponding to the output buffer) may control batch output of the output data from the output buffer 105 (or the plurality of output sub-buffers). For example, the output data is provided to a subsequent storage apparatus, or the data is transferred from the output buffer 105 to the input buffer 104 to prepare for a subsequent operation.

In this embodiment of the present disclosure, the CNN model is used as an example. Each piece of input data inputted to each calculation unit and a convolution kernel provided at the calculation unit each may be a two-dimensional data matrix. For example, an image processing process is performed by using the CNN model, and a convolution kernel is a feature weight in the CNN model. During convolutional calculation, input data is an image feature map tensor (stored in an NHWC format, N being a quantity of images in this batch of images, H being a quantity of pixels in vertical direction of an image, W being a quantity of pixels in a horizontal direction, and C being a quantity of channels). That is, each piece of input data is feature data extracted from the image, and may be represented by the quantity H of pixels in the vertical direction, the quantity W of pixels in the horizontal direction, and the quantity C of channels. Each piece of input data of the input data (depth: C) may be a 10 (H)×10 (W) data matrix. To be specific, the data matrix is divided into 10 rows, and each row includes 10 data elements. Correspondingly, each convolution kernel may be a 3×3 weight matrix. To be specific, the weight matrix is divided into three rows, each row includes three weight elements, and each weight element is a weight value to be multiplied by a data element. The input data and the convolution kernel are described only by using two-dimensional data as an example. In actual application, the input data and the convolution kernel may be alternatively three-dimensional data.

In the calculation unit array described in this embodiment of the present disclosure, each calculation unit in a row of calculation units prestores a respective calculation parameter. During calculation by the calculation unit array 103, input data corresponding to a row of calculation units may be sequentially inputted to each calculation unit in the row of calculation units in a pipeline manner, and calculation is performed on the input data and a corresponding calculation parameter in each calculation unit.

The foregoing describes a schematic structural diagram and a general calculation process of the systolic array-based calculation apparatus 100 provided in this embodiment of the present disclosure with reference to FIG. 1. The calculation apparatus 100 may implement multi-depth parallel calculation for input data, so that multiply-accumulate operations such as convolutional calculation can be accelerated.

In a calculation process based on a systolic array structure, utilization efficiency of the systolic array structure and transfer efficiency of transferring input data to an input buffer and fetching output data calculated by a systolic array from an output buffer corresponding to the systolic array are factors that usually need to be considered in the calculation process. In actual application, input data depths and output data depths of different models may be different, and may vary within a specific range. For example, an input data depth and an output data depth value of a lightweight model (a shallow depth model) are small (which are referred to as an input depth of the shallow depth model and an output depth of the shallow depth model), for example, 16 or 8. In this case, if a standard input depth and a standard output depth of a systolic array are, for example, 32, the systolic array-based calculation process described with reference to FIG. 1 results in a significant reduction in utilization of the systolic array. For example, in accordance with a determination that the standard input depth and the standard output depth of the systolic array are both 32 and the input depth and the output depth of the shallow depth model are both 8, only calculation results of calculation units in 8 rows×8 columns of the 32×32 systolic array are valid (24 pieces of input data inputted to remaining 24 rows are filled with 0 s). Therefore, utilization efficiency of calculation units in the systolic array is reduced to ¹⁄₁₆, which seriously affects performance. In addition, only a piece of input data with a depth of 8 is inputted to the systolic array each time, and eight pieces of output data of the shallow depth model (calculation being based on the systolic array) are written according to a degree of parallelism of 32 when the output data is written to an output buffer. In this case, each time 32 pieces of output data are written, there are 24 pieces of invalid data. In accordance with a determination that data in the output buffer needs to be used in subsequent processing, the 32 pieces of output data are all obtained from the output buffer. As a result, a large amount of invalid data is transferred, which also reduces transfer efficiency. In the case of the calculation process applied to the shallow depth model, utilization efficiency of the systolic array structure and data transfer efficiency are usually not high.

Therefore, to resolve the foregoing problems, embodiments of the present disclosure provide a data processing method and a calculation apparatus based on a shallow depth model of a systolic array. In embodiments of the present disclosure, different input data and/or different output data are/is spliced according to a target input depth and a target output depth of the shallow depth model. In this way, different input data can be inputted to an input buffer in parallel, and then different input data is provided to the systolic array. In addition, different output data can be outputted from the output buffer in batches, so that transfer efficiency of input/output data can be improved. In addition, data of each row is transferred between adjacent calculation units in a systolic manner, and calculation results of calculation units in each column are transferred between adjacent calculation units in a systolic manner and accumulated, so that most calculation units in the systolic array can always be in a calculation state. In addition, during calculation by the shallow depth model, calculation units corresponding to different row sets and column sets can be used for different input data and corresponding output data. Therefore, utilization efficiency of the systolic array can be more effectively improved, a throughput can be increased, and an operation delay can be reduced, thereby reducing a total cost of ownership (TCO, which is used for assessing an operating expense of a data center).

A data processing method and apparatus based on a shallow depth model of a systolic array according to embodiments of the present disclosure are described below with reference to FIG. 2 to FIG. 10D.

Figure 2:
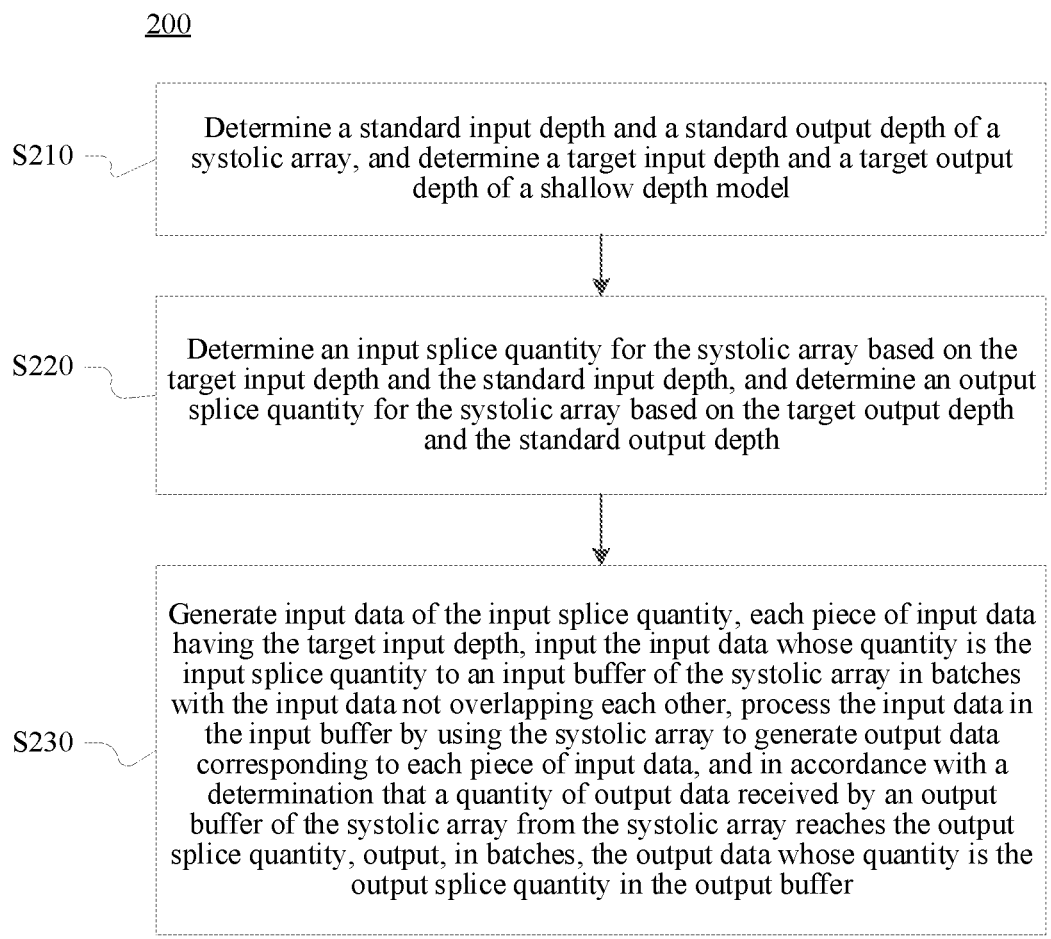
FIG. 2 is a schematic flowchart of a systolic array-based data processing method 200 according to an embodiment of the present disclosure.

FIG. 2 is a schematic flowchart of a data processing method 200 based on a shallow depth model of a systolic array according to an embodiment of the present disclosure. The data processing method 200 is applied to, for example, the calculation apparatus 100, but is not limited thereto.

As shown in FIG. 2, in step S210, a standard input depth and a standard output depth of the systolic array are determined, and a target input depth and a target output depth of the shallow depth model are determined.

As described above, the systolic array may be a calculation unit array, and a quantity of rows and a quantity of columns of the calculation unit array may correspond to the standard input depth and the standard output depth respectively. In some embodiments, the quantity of rows and the quantity of columns of the calculation unit array may be equal to the standard input depth and the standard output depth may respectively. In some other embodiments, the quantity of rows and the quantity of columns of the calculation unit array may be greater than the standard input depth and the standard output depth respectively, so that calculation units in some rows and columns serve as alternatives or redundancy. An example in which the quantity of rows and the quantity of columns of the calculation unit array are equal to the standard input depth and the standard output depth respectively is used in the following descriptions of the present disclosure. However, the quantity of rows and the quantity of columns of the calculation unit array may not be equal to the standard input depth and the standard output depth respectively. This is not limited in the present disclosure.

The shallow depth model is a depth model that meets at least one of the following conditions: An input depth is less than the standard input depth of the systolic array; and an output depth is less than the standard output depth of the systolic array. In some embodiments of the present disclosure, considering an actual case of computer data processing, the standard input depth and the standard output depth of the systolic array are usually powers of 2, and the target input depth and the target output depth of the shallow depth model are also powers of 2.

However, this is not necessarily required, and a standard input depth and a standard output depth of other values (for example, values that are not powers of 2) of the systolic array, and a target input depth and a target output depth of other values of the shallow depth model are also possible. For example, the standard input depth and the standard output depth of the systolic array are 48 and 96 respectively, and the target input depth and the target output depth of the shallow depth model may be 24 and 32, 31 and 42, or the like respectively. This is not limited in the present disclosure.

In the following detailed descriptions of this specification, for ease of description, in an example, a case that depths of a piece of input data inputted to the systolic array and corresponding output data are both powers of 2 is described. However, other cases are also based on the same principle.

In step S220, an input splice quantity for the systolic array is determined based on the target input depth and the standard input depth, and an output splice quantity for the systolic array is determined based on the target output depth and the standard output depth, the input splice quantity and/or the output splice quantity being an integer greater than 1.

In some embodiments, in step S220, a ratio of the standard input depth to the target input depth may be determined, and an integer part of the ratio may be used as the input splice quantity. Similarly, in step S220, a ratio of the standard output depth to the target output depth may be determined, and an integer part of the ratio may be used as the output splice quantity. For example, to ensure consistency of an input depth and an output depth, the standard input depth and the standard output depth of the systolic array may be equal (in most cases in a current AI processor), for example, both are 32, and the target input depth and the target output depth of the shallow depth model are both 8, and in this case, it can be determined that the input splice quantity is 4 and the output splice quantity is also 4; or the target input depth of the shallow depth model is 16, and the target output depth is 8, and in this case, it can be determined that the input splice quantity is 2 and the output splice quantity is 4.

In an example, the target input depth of the shallow depth model is 32, and the target output depth is 8, and in this case, it can be determined that the input splice quantity is 1, that is, a depth of each piece of input data inputted to the shallow depth model for calculation is 32 (that is, 32 data input channels), and the output splice quantity is 4; or the target input depth of the shallow depth model is 8, and the target output depth is 32, and in this case, it can be determined that the input splice quantity is 4 and the output splice quantity is 1, that is, a depth of output data outputted after each piece of input data undergoes calculation by the shallow depth model is 32 (that is, 32 data output channels).

In addition, in accordance with a determination that the target input depth and the target output depth of the shallow depth model are not powers of 2, the input splice quantity and the output splice quantity may be determined based on values of the standard input depth and the standard output depth of the systolic array and values of the target input depth and the target output depth of the shallow depth model. For example, in accordance with a determination that the standard input depth and the standard output depth are both 32 and the target input depth and the target output depth are 15 and 7 respectively, the input splice quantity may be 2, and the output splice quantity may be 4. Calculation units in remaining rows and columns of the systolic array are not used for the current calculation, that is, the systolic array can be considered as an array with 30 rows and 28 columns.

In accordance with a determination that the input splice quantity or the output splice quantity is greater than 1, it needs to be ensured that there are a plurality of pieces of input data, so that data splicing can be performed at input or output of the systolic array to perform systolic array-based calculation operations in this embodiment of the present disclosure.

In an example, in accordance with a determination that only one piece of initial input data (one image feature map tensor (for example, in the foregoing NHWC format, N being equal to 1)) is obtained, the initial input data may be tiled in a horizontal direction H and a vertical direction W as needed to obtain a plurality of pieces of input data. In accordance with a determination that a depth of each piece of input data obtained through tiling is greater than the target input depth, the tiled input data is segmented according to the target input depth in a depth direction (in accordance with a determination that equal segmentation is impossible, data of a channel corresponding to an insufficient depth of the last segment is complemented with 0 s). In addition, for each piece of input data, in accordance with a determination that the input data is segmented in a depth direction to obtain a plurality of segments of input data, a plurality of rounds of operations may be performed for the segmented input data, and a subsequent processing unit may obtain, from an output buffer, values of a plurality of pieces of output data corresponding to the plurality of segments of input data, and then perform summation on the plurality of pieces of output data to obtain a value of output data corresponding to the input data.

On the other hand, in accordance with a determination that a plurality of pieces of initial input data (image feature map tensors (for example, in the foregoing NHWC format, N being an integer greater than 1)) are obtained in batches, each piece of initial input data (image feature map tensor) may be used as a piece of input data to be inputted to the systolic array to obtain a plurality of pieces of input data. In addition, for each piece of input data, in accordance with a determination that a depth is also greater than the target input depth, the input data may also be further segmented according to the target input depth to obtain input data of the target input depth.

In step S230, input data of the input splice quantity is generated, each piece of input data having the target input depth, the input data matching the input splice quantity is inputted to an input buffer of the systolic array in batches with the input data not overlapping each other, and the systolic array processes the input data in the input buffer to generate output data corresponding to each piece of input data, each piece of output data having the target output depth; and in accordance with a determination that a quantity of output data received by the output buffer of the systolic array from the systolic array reaches the output splice quantity, the output data matching the output splice quantity in the output buffer is outputted in batches.

For example, in step S230, a plurality (the input splice quantity) of input data may be provided to the input buffer of the systolic array in batches, and then the input buffer provides the input data to different row sets of the systolic array according to a time sequence. For example, each of four pieces of input data (a depth of each piece of input data being 8) may be inputted to the input buffer and provided to eight different rows of the systolic array.

For example, in accordance with a determination that the output splice quantity is an integer greater than 1, a plurality of pieces of output data may be outputted from the systolic array at different times, that is, the output data of the output splice quantity is outputted. In addition, the output data of the output splice quantity may be buffered to the output buffer of the systolic array, and then the output data of the output splice quantity may be obtained from the output buffer in batches. For example, four pieces of output data (a depth of each piece of output data being 8) outputted by 4×8 columns of the systolic array are write to the output buffer, and then the four pieces of output data are read from the output buffer all at once.

With the systolic array-based data processing method described with reference to FIG. 2, for the shallow depth model, a plurality of pieces of input data (with the same depth) may be transferred from another apparatus to the input buffer in batches, and collectively serve as input of the systolic array by using the input buffer, so that transfer efficiency of input data can be improved. In addition, a plurality of pieces of output data (with the same depth) may be further buffered in the output buffer, so that the plurality of pieces of output data can be outputted from the output buffer in batches. Therefore, transfer efficiency of output data can be further improved.

Figure 3:
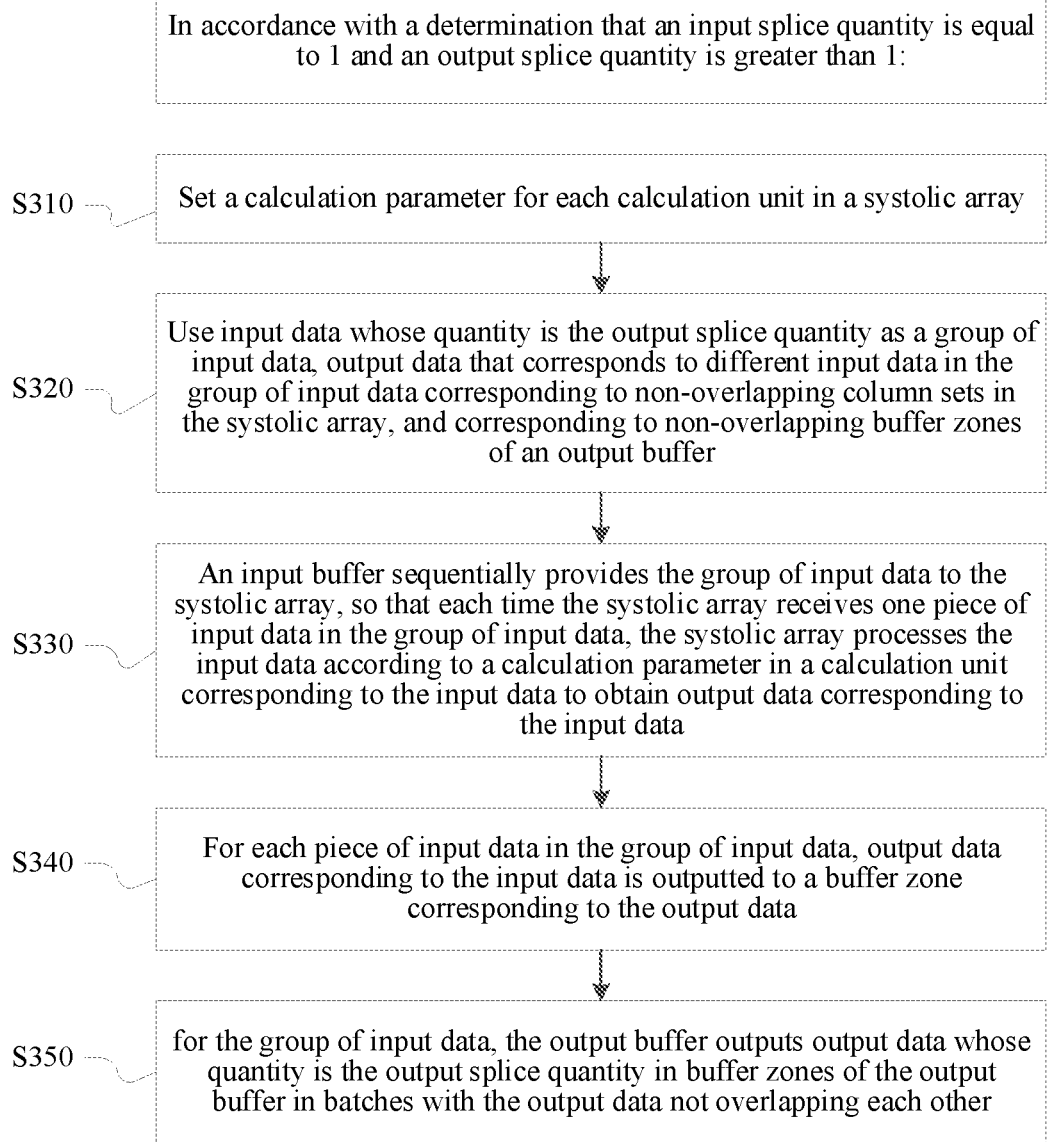
FIG. 3 is a schematic diagram of an example process of steps of the method shown in FIG. 2.
Figure 4A:
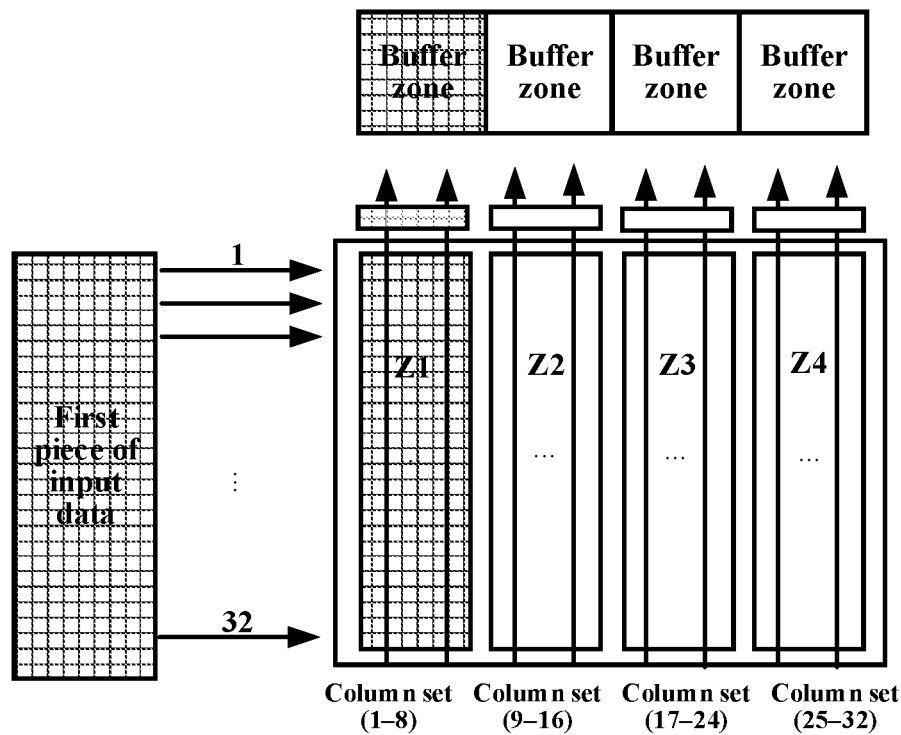
FIG. 4A and FIG. 4B show a specific example.

The data processing method based on a shallow depth model of a systolic array according to embodiments of the present disclosure is further described below with reference to FIG. 3 to FIG. 4B. FIG. 3 is a schematic diagram of a specific process of step S230 of the method 200 shown in FIG. 2. FIG. 4A and FIG. 4B show a specific example of the method 200 shown in FIG. 2.

Figure 4A:
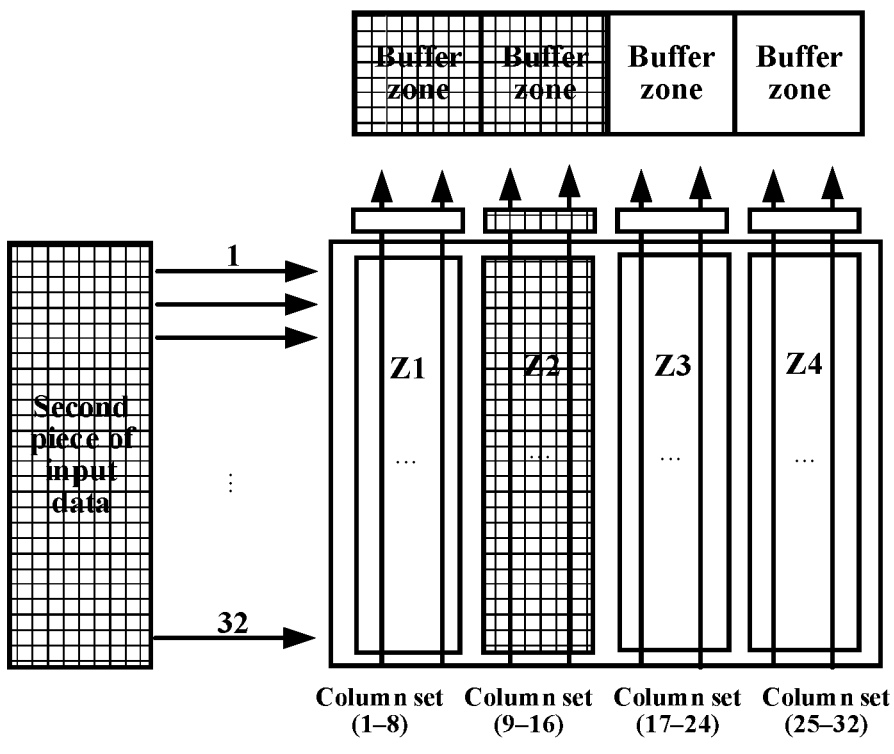
Figure 4B:
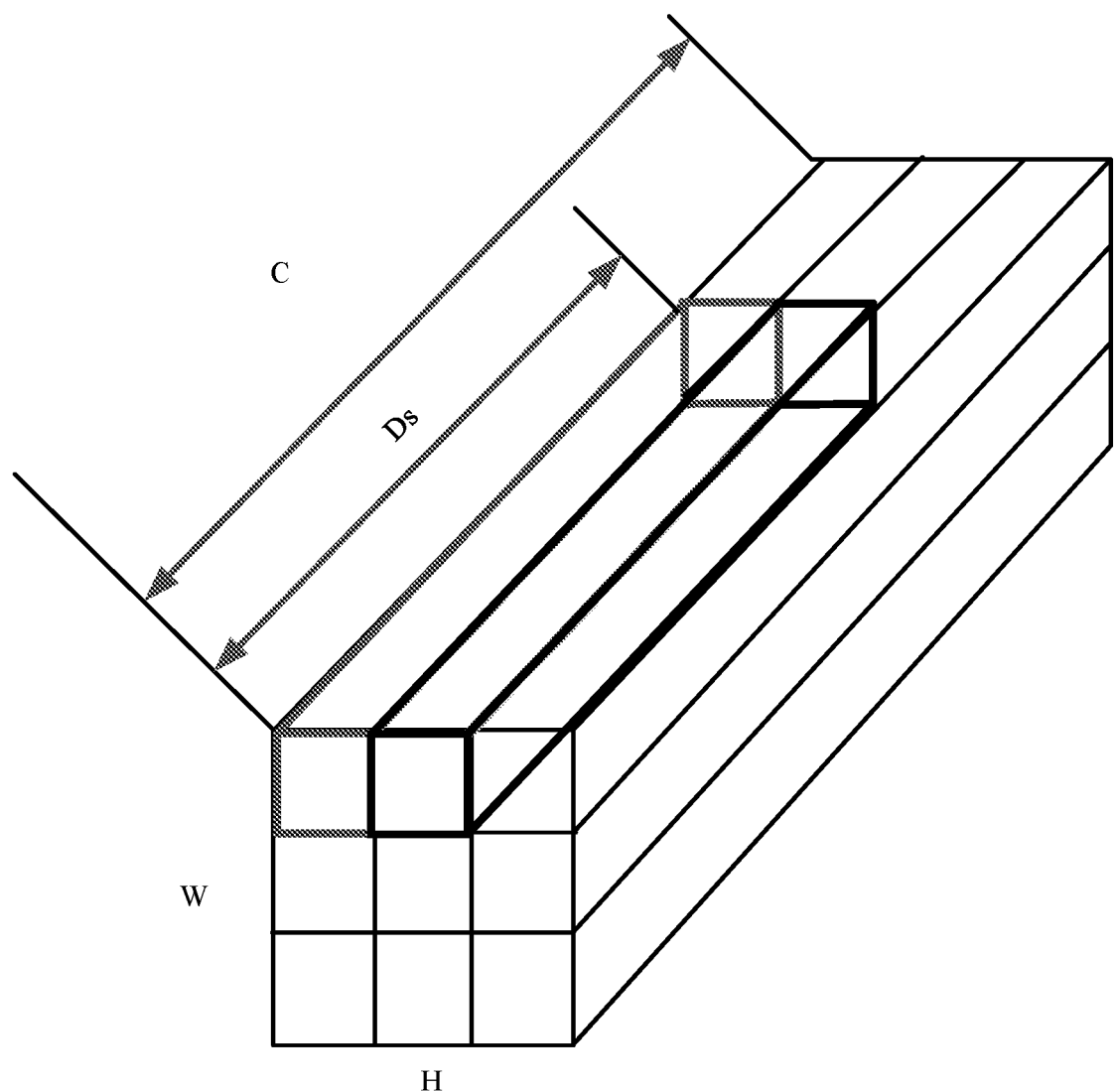

FIG. 3 to FIG. 4B correspond to a case that the input splice quantity is equal to 1 and the output splice quantity is greater than 1. In this case, step S230 of the method may be further implemented as including the following steps.

In step S310, a calculation parameter is set for each calculation unit in the systolic array.

For example, setting a calculation parameter for each calculation unit may include: before a calculation process for each piece of input data is performed, prestoring a required calculation parameter at each calculation unit; or in a calculation process for each piece of input data, sequentially providing a calculation parameter to each calculation unit in a systolic manner based on a clock used in a transfer process of the input data, to perform calculation at each calculation unit.

For example, the systolic array may be used for calculation at a convolutional layer in a CNN model. Therefore, the calculation unit may include a calculation parameter such as a convolution kernel, so that the convolution kernel (for example, the 3×3 weight matrix described above) at the calculation unit can be set. In this embodiment, the calculation parameter of each calculation unit is determined with respect to each piece of input data. This is described in subsequent steps.

In step S320, input data matching the output splice quantity is used as a group of input data, output data that corresponds to different input data in the group of input data corresponding to non-overlapping column sets in the systolic array, and corresponding to non-overlapping buffer zones of the output buffer.

For example, as shown in FIG. 4A, the standard input depth and the standard output depth of the systolic array are both 32, and the target input depth and the target output depth of the shallow depth model are 32 and 8 respectively. Therefore, it can be determined that the input splice quantity is 1 and the output splice quantity is 4. In addition, four pieces of input data (a depth of each piece of input data being 32) are generated as a group of input data to be inputted to the input buffer at different times (sequentially) and then provided to each row of the systolic matrix. Output data (that is, data calculated by using the systolic array) corresponding to the first piece of input data may be outputted from the 1st to the 8th columns of the systolic array (that is, corresponding to the 1st to the 8th columns) and buffered to the first buffer zone of the output buffer, output data corresponding to the second piece of input data may be outputted from the 9th to the 16th columns of the systolic array (that is, corresponding to the 9th to the 16th columns) and buffered to the second buffer zone of the output buffer, output data corresponding to the third piece of input data may be outputted from the 17th to the 24th columns of the systolic array (that is, corresponding to the 17th to the 24th columns) and buffered to the third buffer zone of the output buffer, and output data corresponding to the fourth piece of input data may be outputted from the 25th to the 32nd columns of the systolic array (that is, corresponding to the 25th to the 32nd columns) and buffered to the fourth buffer zone of the output buffer. Different zones of the output buffer do not overlap. Further, as described above, the output buffer may include a plurality of output sub-buffers, and a quantity of output sub-buffers may be the same as a quantity of columns of the systolic array. Therefore, output data outputted by the last calculation unit in each column in each column set of the systolic array is buffered to a plurality of output sub-buffers matching equal to a quantity of columns in the column set, and the plurality of sub-buffers correspond to a buffer zone of the foregoing output buffer.

In step S330, the input buffer sequentially provides the group of input data to the systolic array, so that each time the systolic array receives one piece of input data in the group of input data, the systolic array processes the input data according to a calculation parameter in a calculation unit corresponding to the input data to obtain output data corresponding to the input data.

For example, it is assumed that the group of input data includes four pieces of input data (a depth of each piece of input data being 32, and a depth of corresponding output data being 8). As shown in FIG. 4A, each time a piece of input data is provided to the input buffer, the input buffer provides the input data to the systolic array (a plurality of pieces of (multi-channel) input data of the input data are inputted, in a systolic manner according to a specific time sequence, to rows corresponding to the systolic array). For each piece of input data, the systolic array outputs output data corresponding to the input data. At least after the input buffer provides a piece of input data to the systolic array, another piece of input data is inputted to the input buffer.

In step S340, for each piece of input data in the group of input data, output data corresponding to the input data is outputted to a buffer zone corresponding to the output data.

In accordance with a determination of this embodiment, according to an operating principle of the systolic array, the input buffer inputs a piece of input data (for example, a depth is 32) to the systolic array in each calculation process, that is, for example, 32 pieces of input data of the input data are inputted to 32 rows of the systolic array according to a specific time sequence, each calculation unit in each row performs calculation according to a piece of input data inputted to the row and a calculation parameter, and accumulation is performed with a calculation result of a calculation unit in a previous row of the same column. In this embodiment, a depth of the output data corresponding to the input data is small (for example, a depth of output data shown in FIG. 4A is 8). Therefore, output data corresponding to the input data only needs to be outputted from some columns (for example, eight columns). In addition, calculation parameters related to the input data need to be set at calculation units at intersection points between the columns (for example, eight columns) and rows (for example, 32 rows) of the systolic array that correspond to the depth of the input data. For example, a calculation parameter is prestored at each calculation unit or provided to each calculation unit in a systolic manner according to a time sequence in a calculation process. Certainly, there may be alternatively another manner of providing a calculation parameter, provided that a calculation parameter can be provided for current calculation without affecting a previous calculation result of other input data. This is not limited in the present disclosure.

Likewise, for each piece of other input data, calculation parameters related to the input data also need to be set at calculation units at intersection points between a column set (eight columns) corresponding to the input data and rows (for example, 32 rows) of the systolic array that correspond to a depth of the input data.

Therefore, in this embodiment, for each piece of input data, calculation parameters need to be set at some specific calculation units. For example, for the first piece of input data, the specific calculation units are calculation units at intersection points between the 1st to the 8th columns and the 1st to the 32nd rows. A calculation parameter may be set at each calculation unit in the calculation unit array. For example, in FIG. 4A, calculation parameters required for calculation of the first piece of input data are set at calculation units at intersection points between the 1st to the 8th columns and the 1st to the 32nd rows (a first zone Z1), calculation parameters required for calculation of the second piece of input data are set at calculation units at intersection points between the 9th to the 16th columns and the 1st to the 32nd rows (a second zone Z2), calculation parameters required for calculation of the third piece of input data are set at calculation units at intersection points between the 17th to the 24th columns and the 1st to the 32nd rows (a third zone Z3), and calculation parameters required for calculation of the fourth piece of input data are set at calculation units at intersection points between the 25th to the 32nd columns and the 1st to the 32nd rows (a fourth zone Z4).

However, considering the operating principle of the systolic array, if no other adjustment is performed, when each piece of input data is inputted to the systolic array, because a calculation parameter required for calculation of other input data is further set on each calculation unit in the calculation unit array, calculation is performed on the input data and the calculation parameter (for example, the third piece of input data and the calculation parameters for the second piece of input data at calculation units in the 9th to the 16th columns). Therefore, other output data is outputted from columns other than a column set that corresponds to output data corresponding to the input data (for example, calculation is performed on the third piece of input data and the calculation parameters at the calculation units in the 9th to the 16th columns, and corresponding output data is outputted from the 9th to the 16th columns), and buffered to the output buffer, so that output data corresponding to previous input data is overwritten. On the other hand, after subsequent input data is inputted, the output data corresponding to the input data in the output buffer is also overwritten, which is not allowed.

In this embodiment of the present disclosure, this problem can be resolved by using following method: During calculation of each piece of input data, writing to a buffer zone that corresponds to output data corresponding to input data other than the input data on which calculation is performed in the group of input data is prohibited. For example, output from an output port of the systolic array may be prohibited by using a controller (for example, an output enabling signal is made to be invalid), or writing to some zones of the output buffer may be prohibited by using the controller (for example, write enabling signals that correspond to write channels corresponding to the zones of the output buffer are made to be invalid).

In this way, output data corresponding to a plurality of pieces of input data may be buffered to different buffer zones of the output buffer, and the output data does not overlap and does not affect each other.

In step S350, for the group of input data, output data matching the output splice quantity in buffer zones of the output buffer is outputted in batches by the output buffer, with the output data not overlapping each other.

For example, as shown in FIG. 4A, four pieces of output data corresponding to four pieces of input data are respectively stored to four non-overlapping buffer zones of the output buffer (each buffer zone including eight output sub-buffers), and the four pieces of output data are transferred from the output buffer to another apparatus (for example, a memory or the input buffer) without overlapping each other.

In the embodiment described with reference to FIG. 3 to FIG. 4A, to output the output data of the output splice quantity in the buffer zones of the output buffer in batches with the output data not overlapping each other, a premise is that there are a plurality of pieces of input data, so that there may be a plurality of pieces of output data for batch output. For example, the plurality of pieces of input data may be divided into at least one group, each group of input data includes input data of the output splice quantity, and remaining input data may be combined with input data whose value is 0 into a group of input data for input. For example, in accordance with a determination that there are 10 pieces of input data and the output splice quantity is 4, the 10 inputs may be divided into three groups to perform the method described with reference to FIG. 3 to FIG. 4A, and one of the three groups of input data includes two pieces of input data whose values are 0.

In an example, in accordance with a determination that only one image feature map tensor (for example, in the foregoing NHWC format, N being equal to 1) is obtained, the image feature map tensor may be tiled in an H direction and a W direction to obtain a plurality of pieces of input data, as shown in FIG. 4B. In accordance with a determination that a value of a depth C of the tensor is equal to the target input depth (denoted as Ds), the target input depth being also the standard input depth in this example, each portion of input data (each data matrix) included in each piece of input data can be exactly inputted to each row of the systolic array. In accordance with a determination that the value of C is less than Ds, (Ds−C) pieces of input data whose values are 0 need to be supplemented to each piece of input data, so that a depth of the input data is Ds. In addition, in accordance with a determination that the value of C is greater than Ds (the case in FIG. 4B), each piece of input data needs to be further segmented into a plurality of segments of input data according to Ds in a C direction. In addition, in accordance with a determination that a depth of remaining one piece of input data is less than Ds, (Ds−(C−nDs)) pieces of input data (data matrices) whose values are 0 are supplemented to the remaining one piece of input data, n being greater than or equal to 1. In addition, for each piece of input data, in accordance with a determination that the input data is segmented in a C direction, a plurality of rounds of operations may be performed for the segmented input data, and a subsequent processing unit may obtain, from the output buffer, values of a plurality of pieces of output data corresponding to the plurality of segments of input data obtained by segmenting the input data, and then perform summation on the plurality of pieces of output data to obtain a value of output data corresponding to the input data.

On the other hand, in accordance with a determination that a plurality of image feature map tensors (for example, in the foregoing NHWC format, N being an integer greater than 1) are obtained in batches, each image feature map tensor may serve as a piece of input data. Likewise, each tensor serving as each piece of input data may be further segmented or supplemented according to a magnitude relationship between a value of a depth C of the tensor and the target input depth (denoted as Ds), so that a depth of each piece of input data is Ds. Obviously, a plurality of pieces of input data corresponding to the plurality of tensors may be divided into at least one group of input data (each group including input data of the output splice quantity). For each group of input data, calculation may be performed on the input data according to the method described with reference to FIG. 3.

Likewise, in embodiments described below, obtaining a plurality of pieces of input data may still be similar to that described herein. To be specific, a piece of initial input data obtained is tiled in a horizontal direction and a vertical direction and possibly segmented in a depth direction, or each piece of data of initial input data obtained in batches serves as a piece of input data. Therefore, this is not repeatedly described below.

With the data processing method based on a shallow depth model of a systolic array that is described with reference to FIG. 3 to FIG. 4B, in accordance with a determination that the input splice quantity is equal to 1 and the output splice quantity is greater than 1, output data corresponding to a group of input data (input data of the output splice quantity) can be fetched from the output buffer in batches, thereby improving transfer efficiency of the output data.

Figure 5:
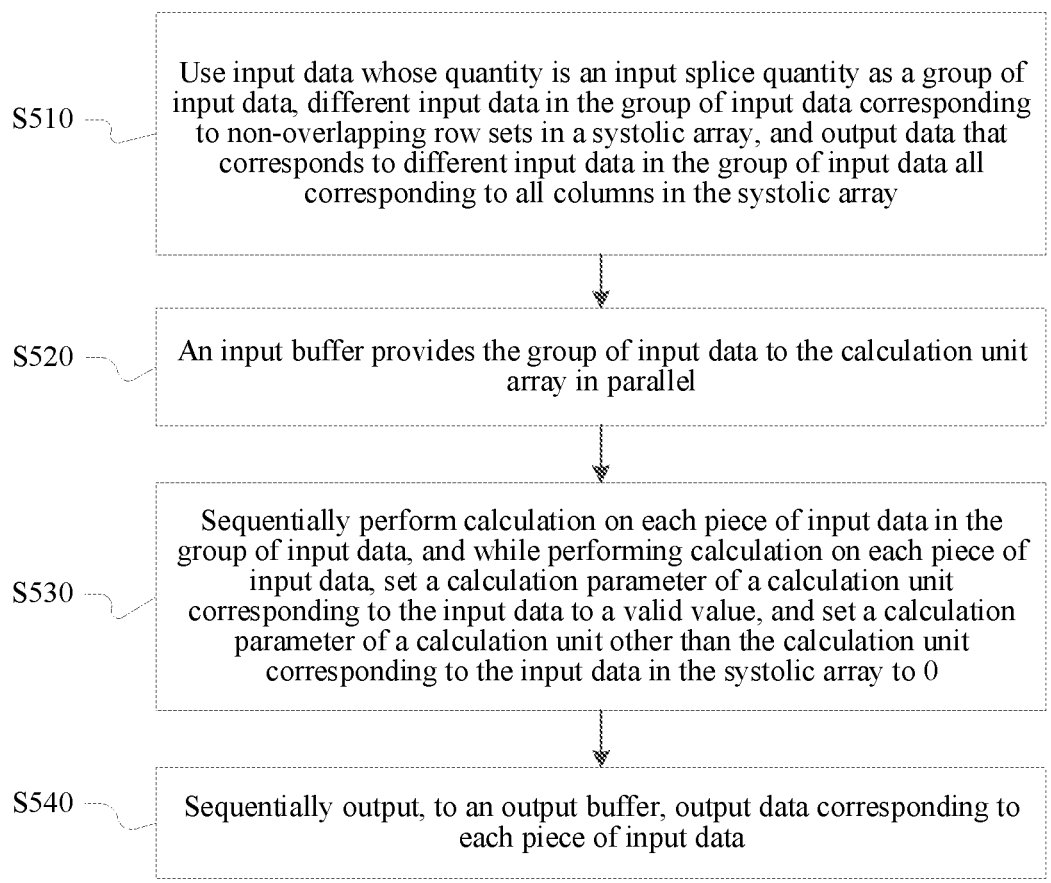
FIG. 5 is a schematic diagram of an example process of steps of the method shown in FIG. 2.
Figure 6:
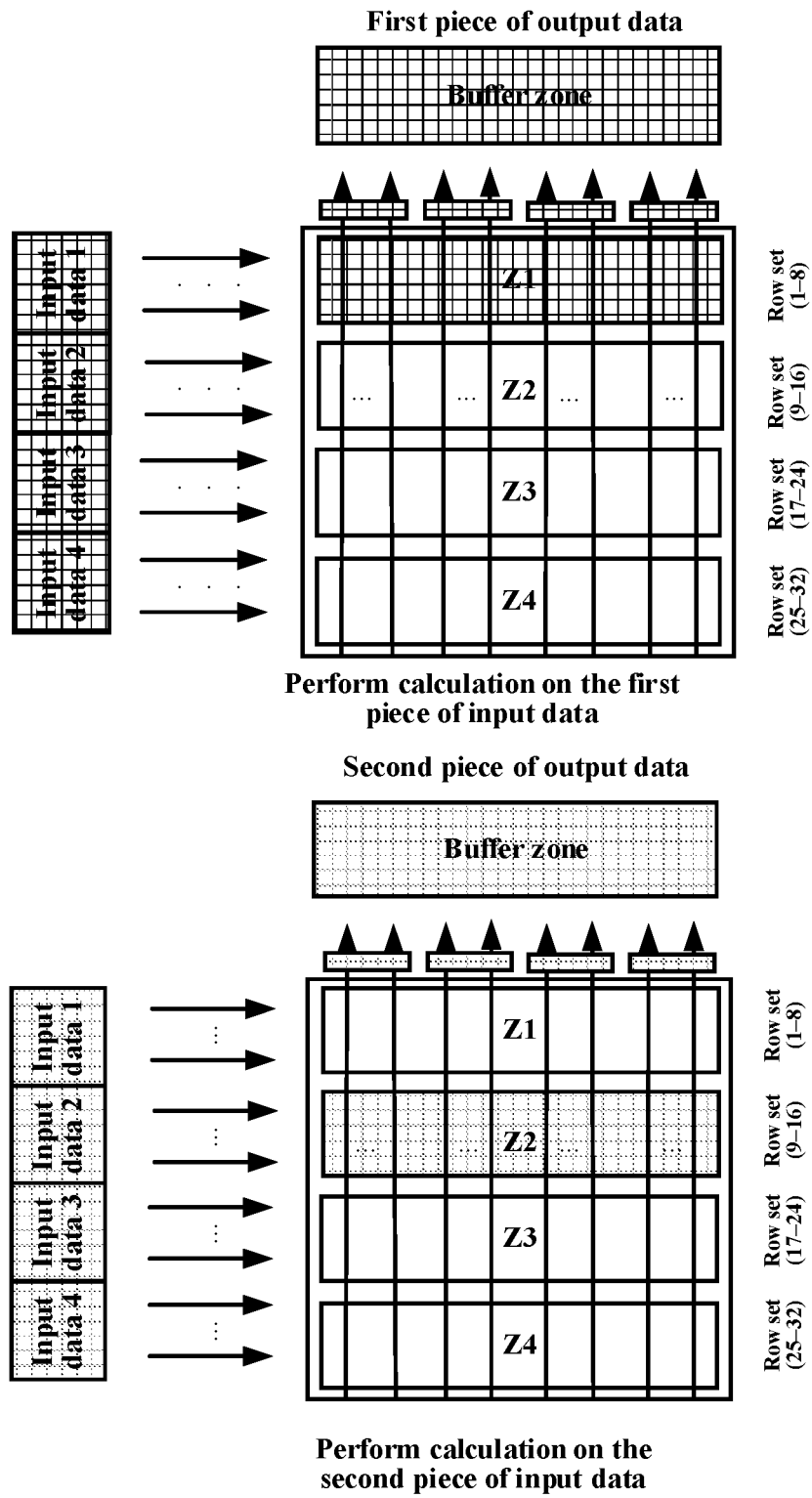
FIG. 6 shows a specific example.

The data processing method based on a shallow depth model of a systolic array according to embodiments of the present disclosure is further described below with reference to FIG. 5 and FIG. 6. FIG. 5 is a schematic diagram of a specific process of step S230 of the method 200 shown in FIG. 2. FIG. 6 shows a specific example.

FIG. 5 and FIG. 6 correspond to a case that the input splice quantity is greater than 1 and the output splice quantity is equal to 1. In this case, step S230 of the method 200 may further include the following steps.

In step 510, the input data matching the input splice quantity is used as a group of input data, different input data in the group of input data corresponding to non-overlapping row sets in the systolic array, and output data that corresponds to different input data in the group of input data all corresponding to all columns in the systolic array.

In some embodiments, output data corresponding to each piece of input data is outputted from all columns of the systolic array to the output buffer. In accordance with a determination that storage space of the output buffer can store only output data corresponding to one piece of input data, output data corresponding to each piece of input data is output to an entire buffer zone of the output buffer, and the output buffer buffers output data corresponding to a next piece of input data only after current output data in the output buffer is fetched. Alternatively, in accordance with a determination that the storage space of the output buffer is large enough to store output data corresponding to a plurality of pieces of input data, output data obtained for each piece of input data may be arranged in a depth-continuous manner in the output buffer. For example, output data corresponding to the first piece of input data may occupy a buffer zone indicated by addresses 0 to 7 in the output buffer, output data corresponding to the first piece of input data may occupy a buffer zone indicated by addresses 8 to 15 in the output buffer, and so on.

For example, as shown in FIG. 6, the standard input depth and the standard output depth of the systolic array are both 32, and the target input depth and the target output depth of the shallow depth model are 8 and 32 respectively. Therefore, it can be determined that the input splice quantity is 4 and the output splice quantity is 1. In addition, four pieces of input data (a depth of each piece of input data being 8) are generated as a group of input data to be inputted to the input buffer and then provided to different row sets of the systolic matrix in parallel. For example, the input buffer provides the first piece of input data to the 1st to the 8th rows of the systolic array (that is, corresponding to a row set including the 1st to the 8th rows), the input buffer provides the second piece of input data to the 9th to the 16th rows of the systolic array (that is, corresponding to a row set including the 9th to the 16th rows), the input buffer provides the third piece of input data to the 17th to the 24th rows of the systolic array (that is, corresponding to a row set including the 17th to the 24th rows), and the input buffer provides the fourth piece of input data to the 25th to the 32nd rows of the systolic array (that is, corresponding to a row set including the 25th to the 32nd rows). In addition, output data (that is, data calculated by the systolic array) corresponding to each of the four pieces of input data may be outputted from the 1st to the 32nd columns of the systolic array and buffered to the entire buffer zone or at least some buffer zones of output buffer (according to the storage space of the output buffer). Further, as described above, the output buffer may include a plurality of output sub-buffers. Therefore, output data outputted by the last calculation unit in each column of the systolic array is buffered to the plurality of output sub-buffers, and the plurality of sub-buffers correspond to the entire buffer zone or at least some buffer zones of the output buffer (according to the storage space of the output buffer).

In step S520, the input buffer provides the group of input data to the calculation unit array in parallel. In step S530, calculation is sequentially performed on each piece of input data in the group of input data, and while performing calculation on each piece of input data, a calculation parameter of a calculation unit corresponding to the input data is set to a valid value, and a calculation parameter of a calculation unit other than the calculation unit corresponding to the input data in the systolic array is set to 0.

Likewise, a manner of setting a calculation parameter at a calculation unit may include prestoring a calculation parameter at each corresponding calculation unit or providing a calculation parameter to each calculation unit in a systolic manner according to a time sequence.

For example, as described above, in a calculation process, the systolic array accumulates calculation results of calculation units in the same column in a column direction and then performs output. Therefore, for the group of input data (a depth being 8) provided to the systolic array in parallel, in a calculation process for each piece of input data, values of calculation parameters of calculation units in a row other than a row set corresponding to the input data needs to be set to 0, so that only calculation results of the input data at calculation units in the corresponding row set are valid values, and calculation results at other calculation units are all 0. Therefore, during superposition of calculation results in the same column, only calculation results of calculation units in the column and a corresponding row set are superimposed, thereby avoiding incorrectly superposing calculation results for different input data in the same column (for example, calculation units in each column may perform calculation for four pieces of input data in one calculation process, and a result of the calculation is incorrect). Based on this, calculation may be performed only for one piece of input data each time the group of input data is inputted. For example, in FIG. 6, first, calculation parameters of calculation units in the 1st to the 8th rows are set to valid values, and values of other calculation units are set to 0. Then the group of input data is inputted in parallel for the first time. After calculation by the systolic array, calculated output data (a depth being 32) corresponding to the first piece of input data (a depth being 8) is outputted in all columns of the systolic array. Next, calculation parameters of calculation units in the 9th to the 16th rows are set to valid values, and values of other calculation units are set to 0. Then the group of input data is inputted in parallel for the second time. After calculation by the systolic array, calculated output data (a depth being 32) corresponding to the second piece of input data (a depth being 8) is outputted in all columns of the systolic array. FIG. 6 shows only a case of two pieces of input data. Similar operations are performed for other input data until output data corresponding to each piece of input data in the group of input data is outputted.

For example, as shown in FIG. 6, the group of input data (four pieces of input data) is inputted to the input buffer (at the same time or different times), that is, the group of input data is all buffered in the input buffer, and the input buffer may provide the group of input data to the systolic array in parallel according to a predetermined time sequence (controlled by the controller and based on the operating principle of the systolic array). For example, the first piece of input data is provided to the 1st to the 8th rows of the systolic array, the second piece of input data is provided to the 9th to the 15th rows of the systolic array, the third piece of input data is provided to the 16th to the 24th of the systolic array, and the fourth piece of input data is provided to the 25th to the 32nd rows of the systolic array.

In step S540, output data corresponding to each piece of input data is sequentially outputted to the output buffer.

For example, as shown in FIG. 6, first, output data corresponding to the first piece of input data is outputted to a buffer zone of the output buffer, and at least after the output buffer is free again (that is, output data buffered in the output buffer is fetched) or when remaining storage space is sufficient for buffering output data corresponding to a next piece of input data, output data corresponding to the second piece of input data is outputted to the entire buffer zone or at least some buffer zones of the output buffer (according to the storage space of the output buffer).

In specific descriptions of embodiments of the present disclosure, flowcharts are used for illustrating steps in descriptions of methods. However, this does not necessarily mean that the methods need to be performed in a shown order; instead, the methods may be performed alternately. As an example rather than a limitation, in the embodiment of FIG. 5 and FIG. 6, a calculation parameter used for calculation of the first piece of input data is set at each calculation unit (calculation parameters of calculation units in the 1st to the 8th rows are valid values, and calculation parameters of calculation units in remaining rows are 0), and in this case, calculation may be performed on the first piece of input data to obtain output data corresponding to the first piece of input data. Further, a calculation parameter used for calculation of the second piece of input data is set at each calculation unit (calculation parameters of calculation units in the 9th to the 16th rows are valid values, and calculation parameters of calculation units in remaining rows are 0), and then calculation is performed on the second piece of input data to obtain output data corresponding to the second piece of input data, and so on. Therefore, an order for performing the steps may be flexibly adjusted according to principles of technical solutions of the present disclosure.

With the data processing method based on a shallow depth model of a systolic array that is described with reference to FIG. 5 and FIG. 6, in accordance with a determination that the input splice quantity is greater than 1 and the output splice quantity is equal to 1, a group of input data (input data of the input splice quantity) is buffered in the input buffer and provided to the systolic array in parallel. Because the input buffer provides the same input to the systolic array for calculation of each piece of input data, the input data needs to be transferred only once (for example, from another memory to the input buffer), thereby improving transfer efficiency of the input data. On the other hand, without the data processing method described in embodiments of the present disclosure, for a plurality of pieces of input data included in the group of input data, a plurality of processes of transferring to the input buffer are required for the plurality of pieces of input data (in this case, data of a channel corresponding to an insufficient depth of each piece of input data relative to the standard input depth of the systolic array is supplemented with 0 s). However, a process of loading a calculation parameter to a calculation unit may be performed only once. With the foregoing data processing method, only one process of transferring to the input buffer is required. Although a calculation parameter is loaded to a calculation unit multiple times in this case (a calculation parameter being correspondingly loaded once for each piece of input data), because a data size of the calculation parameter is generally much less than a data size of the input data, a time required for loading the calculation parameter is much less than a time required for transferring the input data. Therefore, performance in terms of overall time consumption is still good, thereby improving transfer efficiency.

Figure 7:
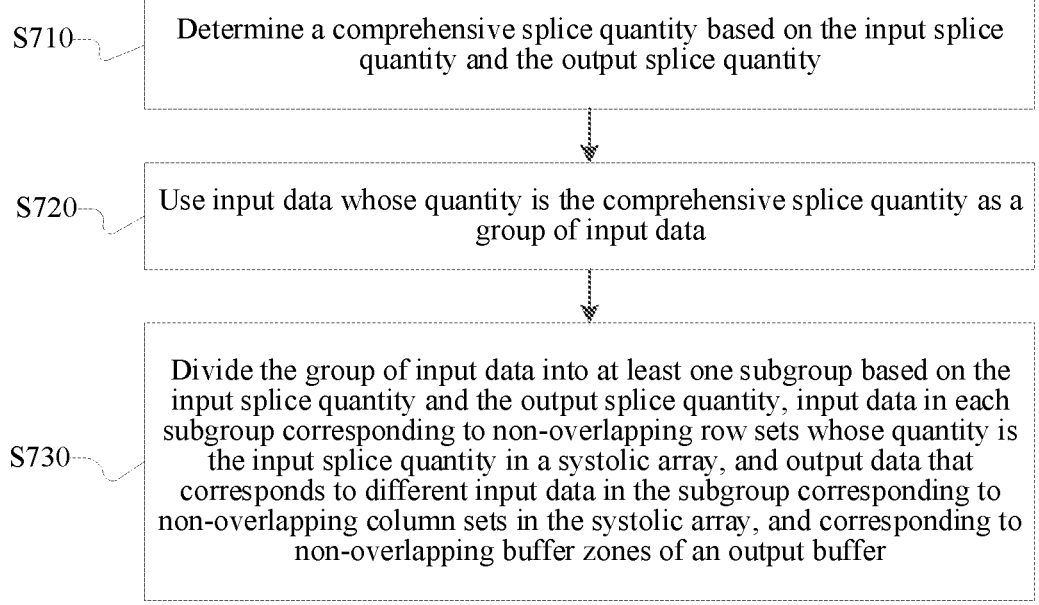
FIG. 7 is a schematic diagram of an example process of steps of the method shown in FIG. 2.
Figure 8A:
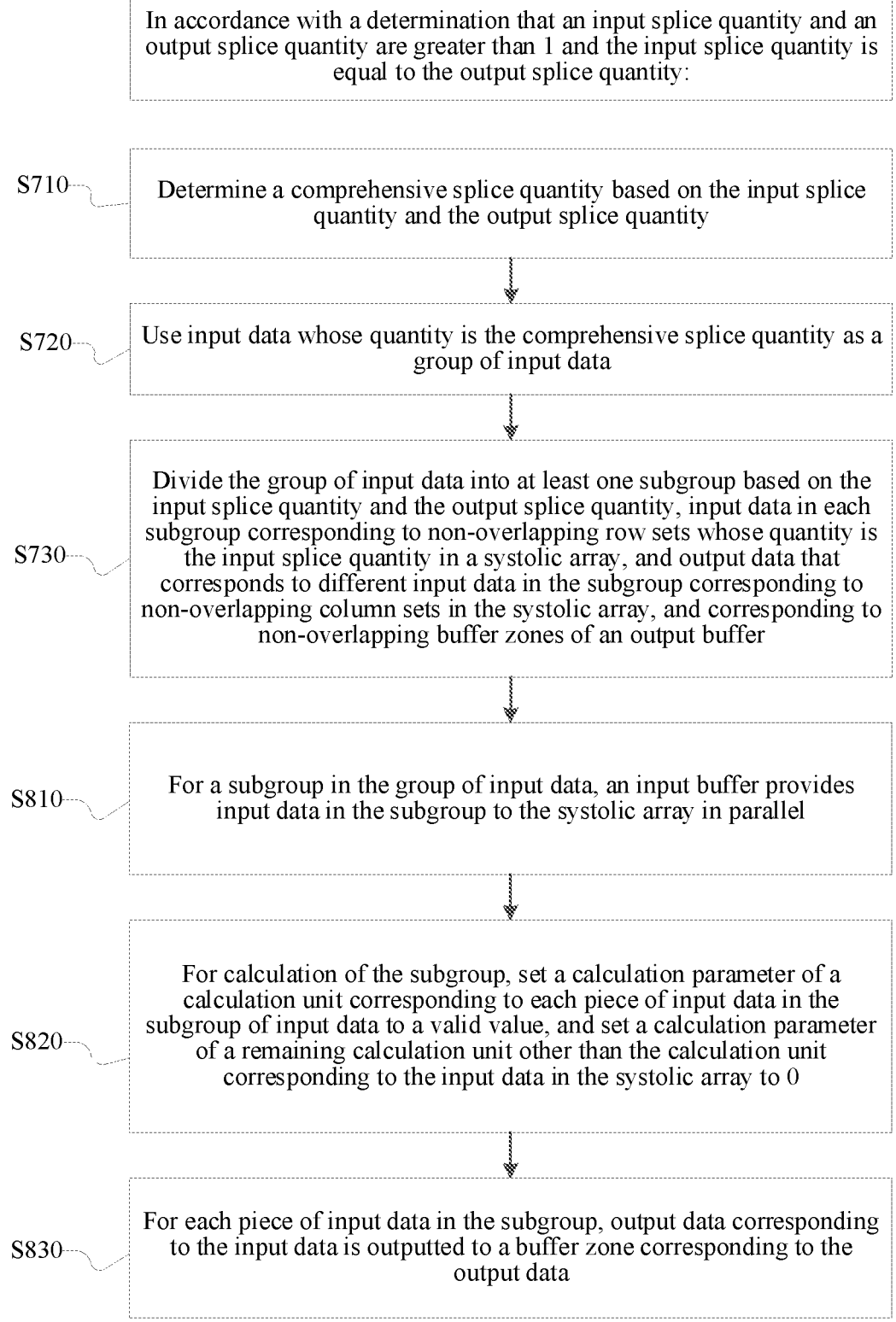
FIG. 8A and FIG. 8B show a case of the process shown in FIG. 7 and a corresponding specific example.
Figure 8B:
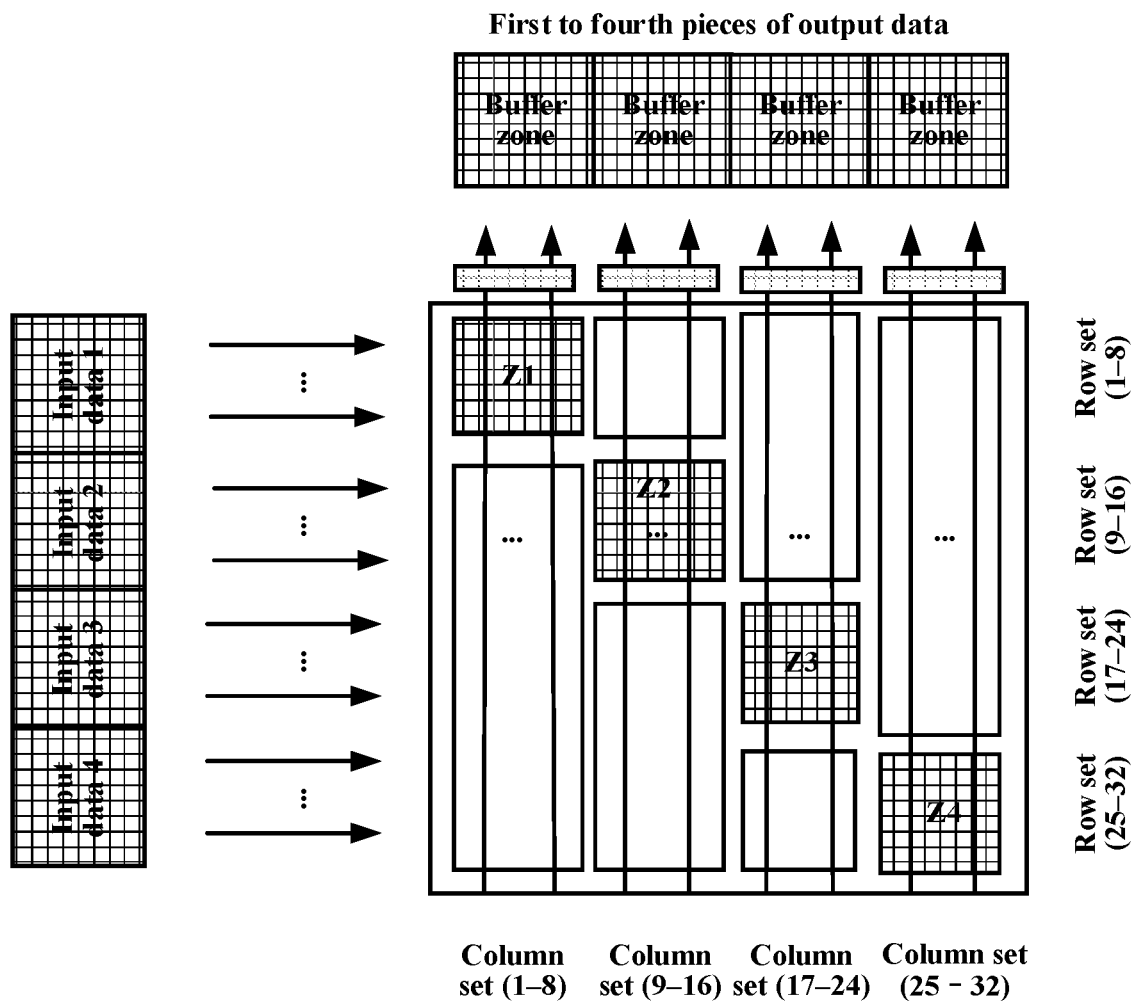

The data processing method based on a shallow depth model of a systolic array according to embodiments of the present disclosure is further described below with reference to FIG. 7 to FIG. 10D. FIG. 7 is a schematic diagram of an example process of steps of the method shown in FIG. 2. FIG. 8A and FIG. 8B show more details about the data processing method of FIG. 7 in accordance with a determination that the input splice quantity is equal to the output splice quantity. FIG. 9A to FIG. 9D show more details about the data processing method of FIG. 7 in accordance with a determination that the input splice quantity is greater than the output splice quantity. FIG. 10A to FIG. 10D show more details about the data processing method of FIG. 7 in accordance with a determination that the input splice quantity is less than the output splice quantity.

In the embodiment of FIG. 7, the input splice quantity is greater than 1, and the output splice quantity is greater than 1. Therefore, step S230 of the data processing method 200 further includes the following steps.

In step S710, a comprehensive splice quantity is determined based on the input splice quantity and the output splice quantity.

In some embodiments, as described in detail below, according to a magnitude and multiple relationship between the input splice quantity and the output splice quantity, the comprehensive splice quantity may be a larger or smaller one of the input splice quantity and the output splice quantity; or in accordance with a determination that the input splice quantity is equal to the output splice quantity, the comprehensive splice quantity is equal to the input splice quantity or the output splice quantity.

In step S720, input data matching the comprehensive splice quantity is used as a group of input data.

In step S730, the group of input data is divided into at least one subgroup based on the input splice quantity and the output splice quantity, input data in each subgroup corresponding to non-overlapping row sets matching the input splice quantity in the systolic array, and output data that corresponds to different input data in the subgroup corresponding to non-overlapping column sets in the systolic array, and corresponding to non-overlapping buffer zones of the output buffer.

In some embodiments, a quantity of subgroups may be 1 or an integer greater than 1. Each subgroup may include one or more pieces of input data.

For example, the standard input depth and the standard output depth of the systolic array are both 32, and the target input depth and the target output depth of the shallow depth model are 16 and 8 respectively. Therefore, it can be determined that the input splice quantity is 2, the output splice quantity is 4, and the comprehensive splice quantity is 4. In addition, the group of input data includes four pieces of input data. However, because the input splice quantity is 2, only two pieces of input data (a depth being 16) can be provided to the systolic array at a time. Therefore, the four pieces of input data are divided into two subgroups, one subgroup includes two pieces of input data, and one subgroup of input data is provided to the systolic array at a time.

FIG. 8A and FIG. 8B show more details about the data processing method of FIG. 7 when the input splice quantity matches the output splice quantity. The method of FIG. 7 may further include the following steps.

In FIG. 8A and FIG. 8B, the input splice quantity and the output splice quantity are equal (being 4 in the figures). In this case, it can be considered that there is only one subgroup, and each subgroup includes input data of the input splice quantity (the output splice quantity).

In FIG. 8A, in step S810, for a subgroup in the group of input data, the input buffer provides input data in the subgroup to the systolic array in parallel.

Likewise, each subgroup of input data corresponds to non-overlapping row sets of the input splice quantity in the calculation unit array, and output data corresponding to different input data in the group of input data corresponds to non-overlapping column sets in the calculation unit array, and corresponds to non-overlapping buffer zones of the output buffer.

For example, as shown in FIG. 8B, the standard input depth and the standard output depth of the systolic array are both 32, and the target input depth and the target output depth of the shallow depth model are both 8. In this case, it can be determined that the input splice quantity is 4 and the output splice quantity is also 4. In addition, four pieces of input data (a depth of each piece of input data being 8) are used as a group of input data to be inputted to the input buffer and then provided to different row sets of the systolic matrix in parallel, and output data corresponding to input data in the group of input data is also outputted from different column sets of the systolic array. For example, the input buffer provides the first piece of input data to the 1st to the 8th rows of the systolic array (that is, corresponding to a row set including the 1st to the 8th rows), and output data corresponding to the first piece of input data is outputted from the 1st to the 8th columns of the systolic array; the input buffer provides the second piece of input data to the 1st to the 8th rows of the systolic array (that is, corresponding to a row set including the 9th to the 16th rows), and output data corresponding to the second piece of input data is outputted from the 9th to the 16th columns of the systolic array; the input buffer provides the third piece of input data to the 17th to the 24th rows of the systolic array (that is, corresponding to a row set including the 17th to the 24th rows), and output data corresponding to the third piece of input data is outputted from the 17th to the 24th columns of the systolic array; and the input buffer provides the fourth piece of input data to the 25th to the 32nd rows of the systolic array (that is, corresponding to a row set including the 25th to the 32nd rows), and output data corresponding to the fourth piece of input data is outputted from the 25th to the 32nd columns of the systolic array. That is, the row sets corresponding to the four pieces of input data included in the subgroup and the column sets corresponding to the four pieces of corresponding output data may be expressed as follows: a first zone Z1 (1-8, 1-8); a second zone Z2 (9-16, 9-16); a third zone Z3 (17-24, 17-24); and a fourth zone Z4 (25-32, 25-32). Further, as described above, the output buffer may include a plurality of output sub-buffers. Therefore, output data outputted by the last calculation unit in each column of the systolic array is buffered to the plurality of output sub-buffers, and the plurality of sub-buffers correspond to the entire buffer zone or at least some buffer zones of the output buffer (according to the storage space of the output buffer).

In step S820, for calculation of the subgroup, a calculation parameter of a calculation unit corresponding to each piece of input data in the subgroup of input data is set to a valid value, and a calculation parameter of a remaining calculation unit other than the calculation unit corresponding to the input data in the systolic array is set to 0.

To be specific, in a calculation process, the systolic array accumulates calculation results of calculation units in the same column in a column direction and then performs output. Therefore, for each piece of input data in each subgroup of input data provided to the systolic array in parallel, in a calculation process for the input data, a calculation parameter at a calculation unit irrelevant with calculation of the input data needs to be set to 0 to ensure accuracy and a correspondence of output data. For example, as shown in FIG. 8B, four zones (Z1 to Z4) are indicated by shaded parts in FIG. 8B, calculation parameters are respectively set for calculation units used for performing calculation on corresponding input data in the shaded areas, and calculation parameters of other calculation units (for example, areas in blank blocks) in each column are set to 0.

In step S830, for each piece of input data in the subgroup, output data corresponding to the input data is outputted to a buffer zone corresponding to the output data, that is, output data corresponding to the subgroup of input data is buffered in the output buffer.

For example, as shown in FIG. 8B, output data (four pieces of output data) corresponding to each piece of input data in the subgroup of input data is buffered in the output buffer. Therefore, the four pieces of output data can be fetched from the output buffer in batches.

However, in some embodiments, there may be another case: The input splice quantity is greater than 1, the output splice quantity is greater than 1, and the output splice quantity is greater than or less than the input splice quantity.

Figure 9A:
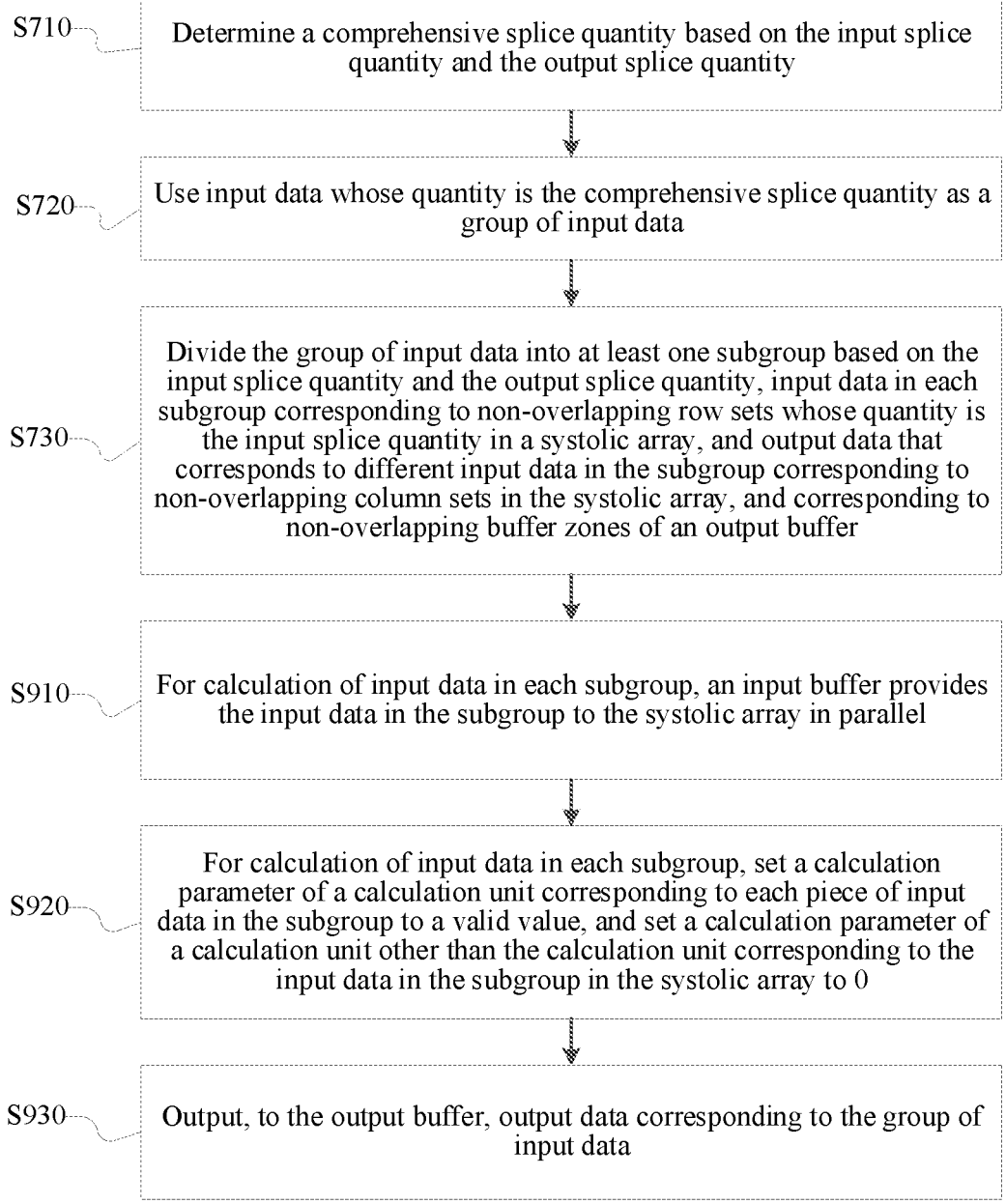
FIG. 9A to FIG. 9D show another case of the process shown in FIG. 7 and another corresponding specific example.

FIG. 9A shows more details about the data processing method of FIG. 7 when the output splice quantity is an integer multiple, which is greater than 1, of the input splice quantity.

In this case, the comprehensive splice quantity is the output splice quantity, and each subgroup of input data includes input data of the input splice quantity. In addition, in this case, the data processing method described with reference to FIG. 7 may further include the following steps.

In step S910, for calculation of input data in each subgroup, the input buffer provides the input data in the subgroup to the systolic array in parallel.

Figure 9B:
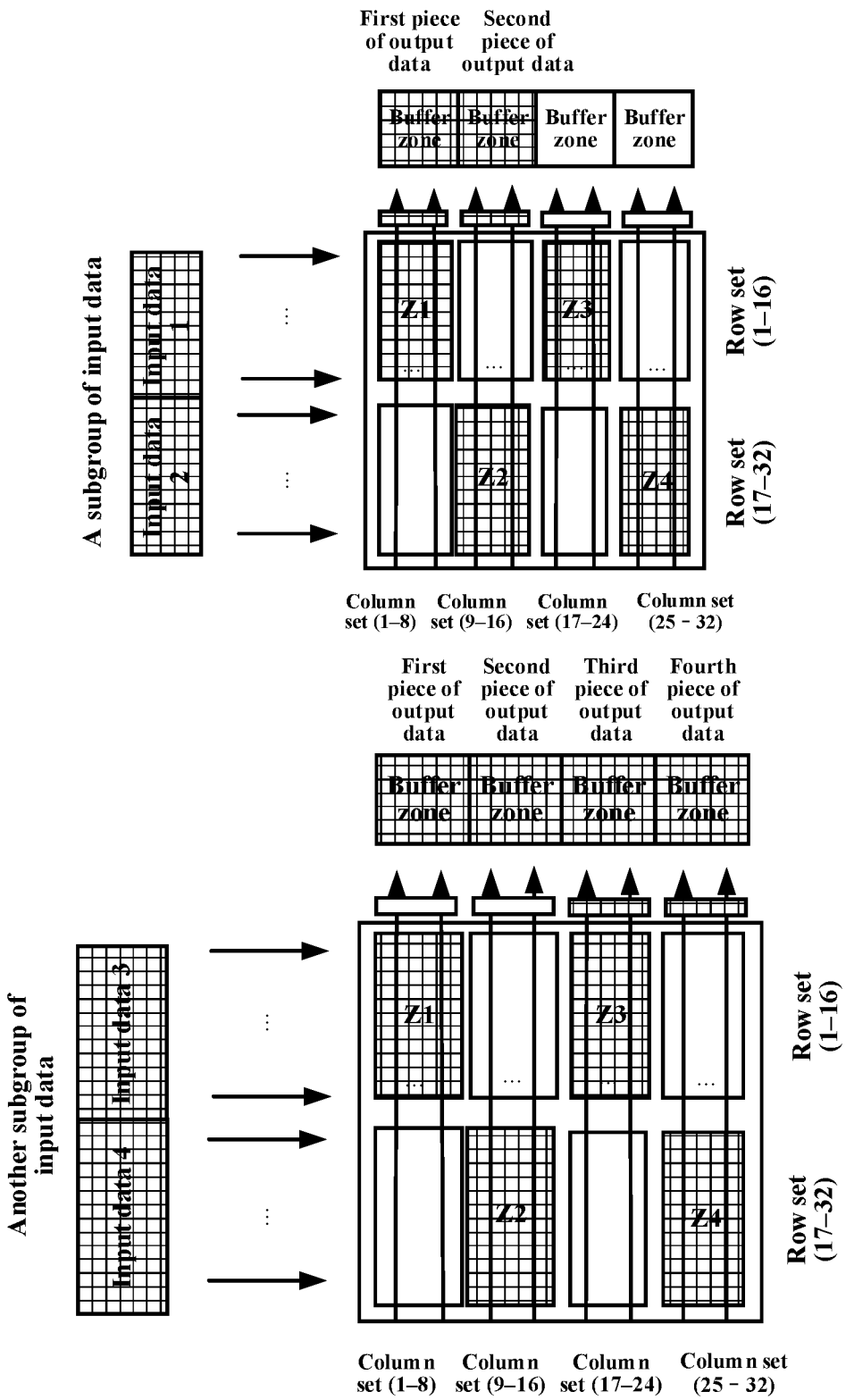

For example, as shown in FIG. 9B, in a case that the standard input depth and the standard output depth of the systolic array are 32 and the target input depth and the target output depth of the shallow depth model are 16 and 8 respectively, the input splice quantity may be 2, the output splice quantity is 4, and the comprehensive splice quantity is 4. A group of generated input data (four pieces of input data) is divided into two subgroups, and each subgroup includes two pieces of input data. Each subgroup of input data (including two pieces of input data) is sequentially inputted to the input buffer, and each subgroup of input data is provided to the systolic array in parallel.

In step S920, for calculation of input data in each subgroup, a calculation parameter of a calculation unit corresponding to each piece of input data in the subgroup is set to a valid value, and a calculation parameter of a calculation unit other than the calculation unit corresponding to the input data in the subgroup in the systolic array is set to 0. This step is equivalent to step S740 in FIG. 7.

For example, as shown in FIG. 9B, row sets corresponding to the first subgroup (including the first piece of input data and the second piece of input data) and column sets corresponding to corresponding output data are respectively expressed as follows: a first zone Z1 (1-16, 1-8) and a second zone Z2 (17-32, 9-16). Before calculation is performed on the first subgroup, calculation parameters need to be set for calculation units in the row sets and the column sets. Row sets corresponding to the second subgroup (including the third piece of input data and the fourth piece of input data) and column sets corresponding to corresponding output data are respectively expressed as follows: a third zone Z3 (1-16, 17-24) and a fourth zone Z4 (17-32, 25-32). Likewise, before calculation is performed on the second subgroup, calculation parameters need to be set for calculation units in the row sets and the column sets. Because zones covered by the row sets and the column sets do not overlap, a simple method is that calculation parameters of calculation units required for calculation of the two subgroups may be set together. In addition, as described above, considering a calculation principle of the systolic array, during calculation of each subgroup of input data, writing is performed only to a buffer zone corresponding to output data of the subgroup of input data, and writing to a buffer zone that corresponds to output data corresponding to a subgroup other than the subgroup is prohibited. That is, during calculation of the first subgroup of input data, only output data respectively corresponding to the two pieces of input data is outputted in two column sets (including columns 1 to 16); and during calculation of the second subgroup of input data, only output data respectively corresponding to next two pieces of input data is outputted in two column sets (including columns 17 to 32).

In step S930, output data corresponding to the group of input data is outputted to the output buffer.

For example, as shown in FIG. 9B, four pieces of output data corresponding to the two subgroups of input data are outputted from the 1st to the 32nd columns of the systolic array (two pieces of output data corresponding to the first subgroup being outputted from the 1st to the 16th columns first, and then two pieces of output data corresponding to the second subgroup being outputted from the 17th to the 32nd columns), that is, outputted to the entire buffer zone or at least some buffer zones of the output buffer, so that an external apparatus or the input buffer can fetch the output data from the output buffer in batches.

Figure 9C:
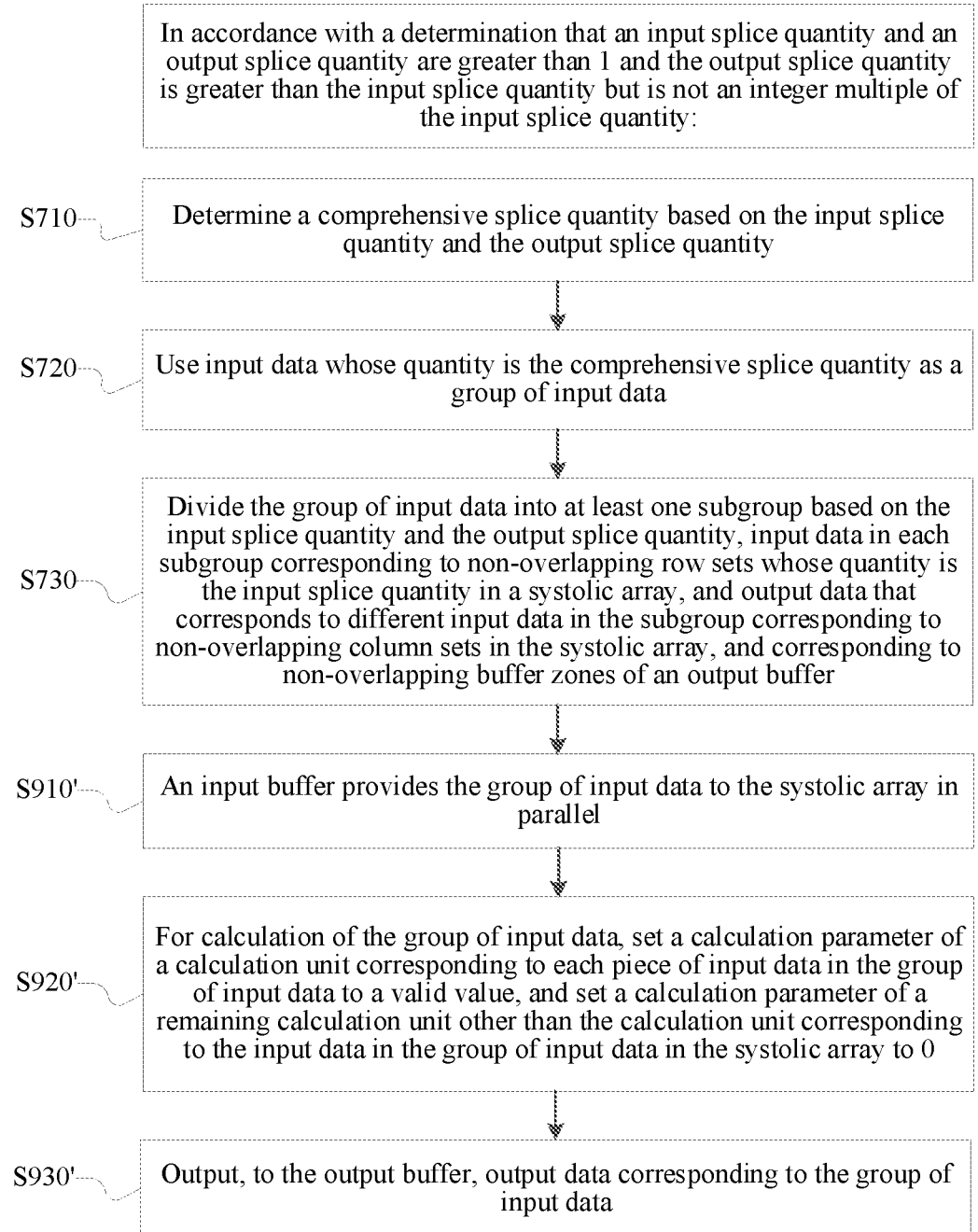

FIG. 9C shows more details about the data processing method of FIG. 7 in a case that the output splice quantity is greater than the input splice quantity but is not an integer multiple of the input splice quantity. In this case, the comprehensive splice quantity is the input splice quantity, and a quantity of subgroups is 1, that is, a group of generated input data includes only one subgroup.

In step S910', the input buffer provides the group of input data to the systolic array in parallel.

Figure 9D:
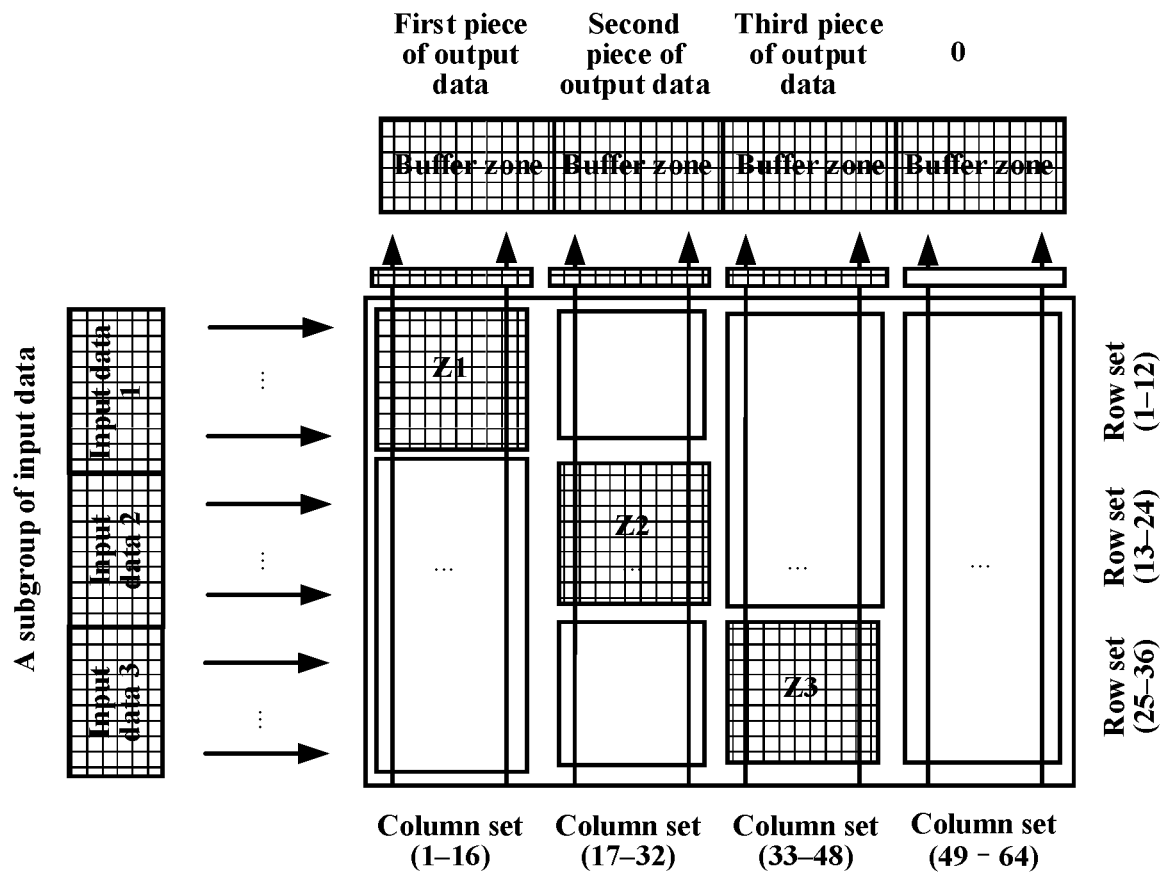

As shown in FIG. 9D, in a case that the standard input depth and the standard output depth of the systolic array are 36 and 64 respectively and the target input depth and the target output depth of the shallow depth model are 12 and 16 respectively, the input splice quantity may be 3, the output splice quantity is 4, and the comprehensive splice quantity is 3. The group of generated input data (three pieces of input data) is inputted to the input buffer in batches, so as to be provided to the systolic array in parallel.

In step S920', for calculation of the group of input data, a calculation parameter of a calculation unit corresponding to each piece of input data in the group of input data is set to a valid value, and a calculation parameter of a remaining calculation unit other than the calculation unit corresponding to the input data in the group of input data in the systolic array is set to 0.

For example, as shown in FIG. 9D, row sets corresponding to the group of input data (including the first to the third pieces of input data) and column sets corresponding to corresponding output data are respectively expressed as follows: (1-12, 1-16), (13-24, 17-32), and (25-36, 33-48). Calculation parameters of calculation units in the row sets and the column sets may be set to valid values, and calculation parameters of remaining calculation units (including calculation units in the 49th to the 64th columns) are set to 0. In addition, because zones covered by the row sets and the column sets do not overlap, calculation parameters of calculation units required for calculation of the two subgroups of input data may be set together.

In step S930', output data corresponding to the group of input data is outputted to the output buffer. Values of at least a part of the entire buffer zone of the output buffer are 0.

For example, as shown in FIG. 9D, three pieces of output data corresponding to the group of input data are outputted from the 1st to the 48th columns of the systolic array, and calculation units in the 49th to the 64th columns also output calculated Os. That is, a buffer zone corresponding to the 1st to the 48th columns in the output buffer stores valid data, and a remaining buffer zone stores Os, so that the output data and Os can be fetched from the output buffer in batches.

The foregoing describes a case that the input splice quantity is greater than 1, the output splice quantity is greater than 1, and the output splice quantity is greater than the input splice quantity with reference to FIG. 9A to FIG. 9D.

The following mainly describes a case that the input splice quantity is greater than 1, the output splice quantity is greater than 1, and the input splice quantity is greater than the output splice quantity.

In some cases, the input splice quantity is an integer multiple, which is greater than 1, of the output splice quantity.

Figure 10A:
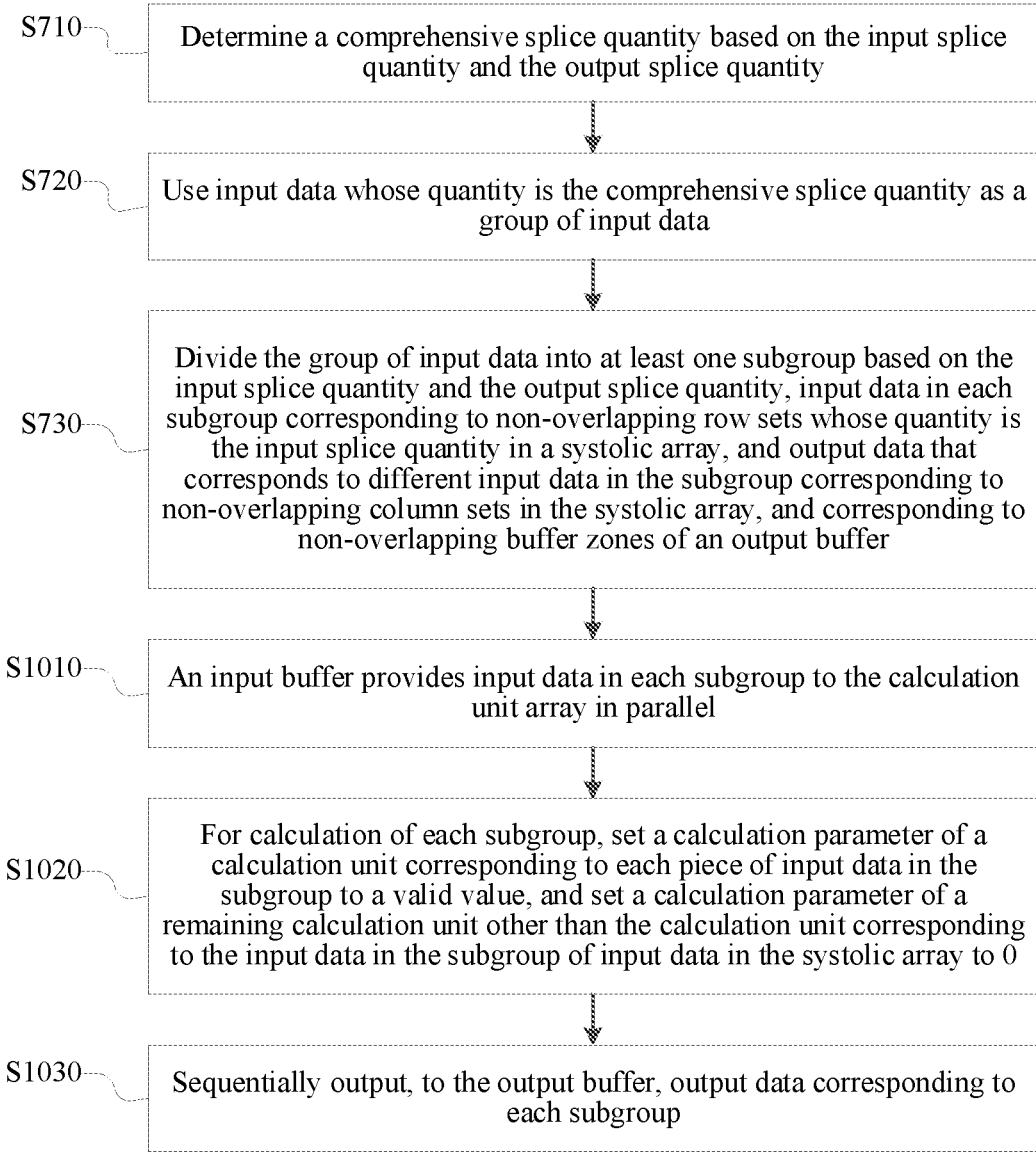
FIG. 10A to FIG. 10D show still another case of the process shown in FIG. 7 and still another corresponding specific example.
Figure 10B:
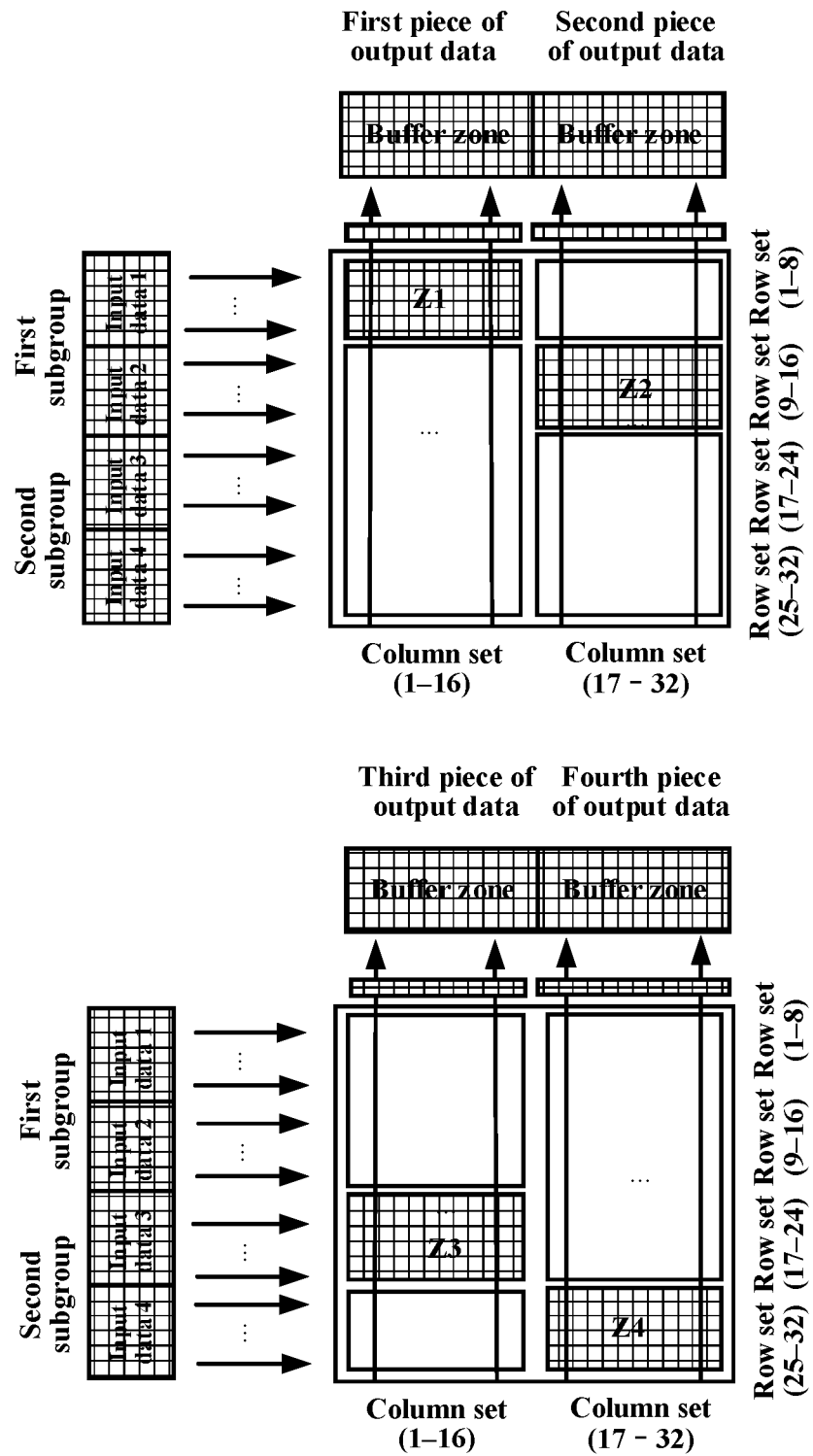

FIG. 10A and FIG. 10B show more details about the data processing method of FIG. 7 in a case that the input splice quantity is an integer multiple, which is greater than 1, of the output splice quantity. In this case, the comprehensive splice quantity is the input splice quantity, and each subgroup of input data includes input data of the output splice quantity.

For example, in a case that the standard input depth and the standard output depth of the systolic array are 32 and the target input depth and the target output depth of the shallow depth model are 8 and 16 respectively, the output splice quantity may be 2, the input splice quantity is 4, and the comprehensive splice quantity is 4. Each subgroup of input data includes two pieces of input data.

The method of FIG. 7 may further include the following steps.

In step S1010, the input buffer provides input data in each subgroup to the calculation unit array in parallel.

For example, as shown in FIG. 10B, four pieces of input data are outputted to the input buffer in batches, and are provided to the calculation unit array in parallel.

In step S1020, for calculation of each subgroup, a calculation parameter of a calculation unit corresponding to each piece of input data in the subgroup is set to a valid value, and a calculation parameter of a remaining calculation unit other than the calculation unit corresponding to the input data in the subgroup of input data in the systolic array is set to 0.

For example, as shown in FIG. 10B, row sets corresponding to the first subgroup (including the first piece of input data and the second piece of input data) and column sets corresponding to corresponding output data are respectively expressed as follows: a first zone Z1 (1-8, 1-16), a second zone Z2 (9-16, 17-32), a third zone Z3 (17-24, 1-16), and a fourth zone Z4 (25-32, 17-32). Calculation parameters of calculation units that are in the first zone Z1 (1-8, 1-16) and that are used for calculation of the first subgroup of input data are set to valid values, calculation parameters of calculation units that are in the second zone Z1 (9-16, 17-32) and that are used for calculation of the first subgroup of input data are set to valid values, and calculation parameters of remaining calculation units are 0. During calculation of the second subgroup of input data, two subgroups of input data are inputted in parallel. However, calculation parameters of calculation units in the third zone Z3 (17-24, 1-16) are set to valid values, calculation parameters of calculation units in the fourth zone Z4 (25-32, 17-32) are set to valid values, and calculation parameters of remaining calculation units are 0.

In step S1030, output data corresponding to each subgroup is sequentially outputted to the output buffer.

For example, in FIG. 10B, after calculation of the first subgroup of input data is completed, output data corresponding to the first piece of input data and the second piece of input data included in the first subgroup of input data is outputted to the output buffer from all columns of the systolic array. In addition, after the output buffer is free again or when remaining storage space is sufficient for buffering output data corresponding to a next piece of input data, a calculation result of the subsequent second subgroup of input data is outputted to the output buffer.

In addition, in some cases, the input splice quantity is greater than the output splice quantity but is not an integer multiple of the output splice quantity.

Figure 10C:
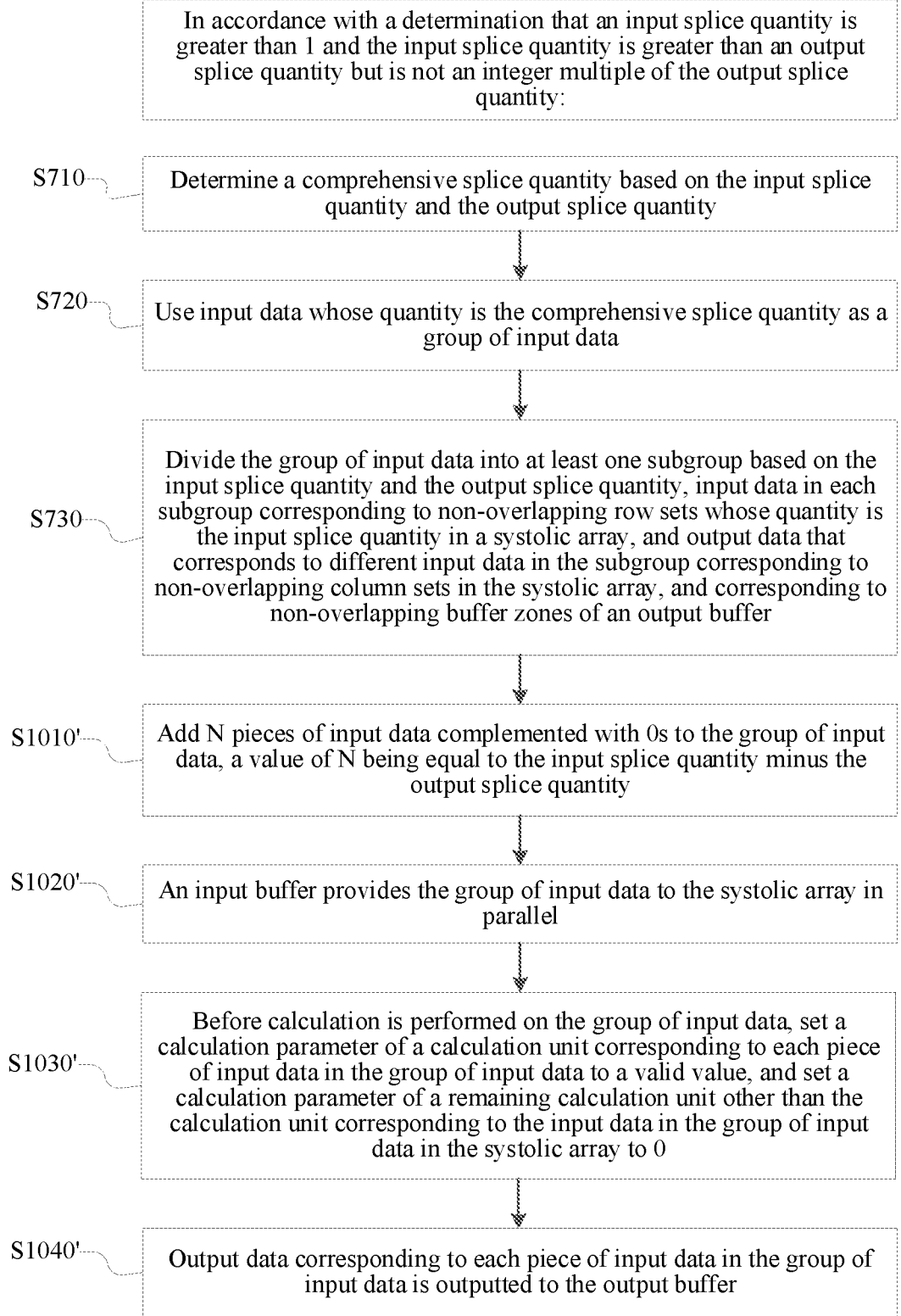
Figure 10D:
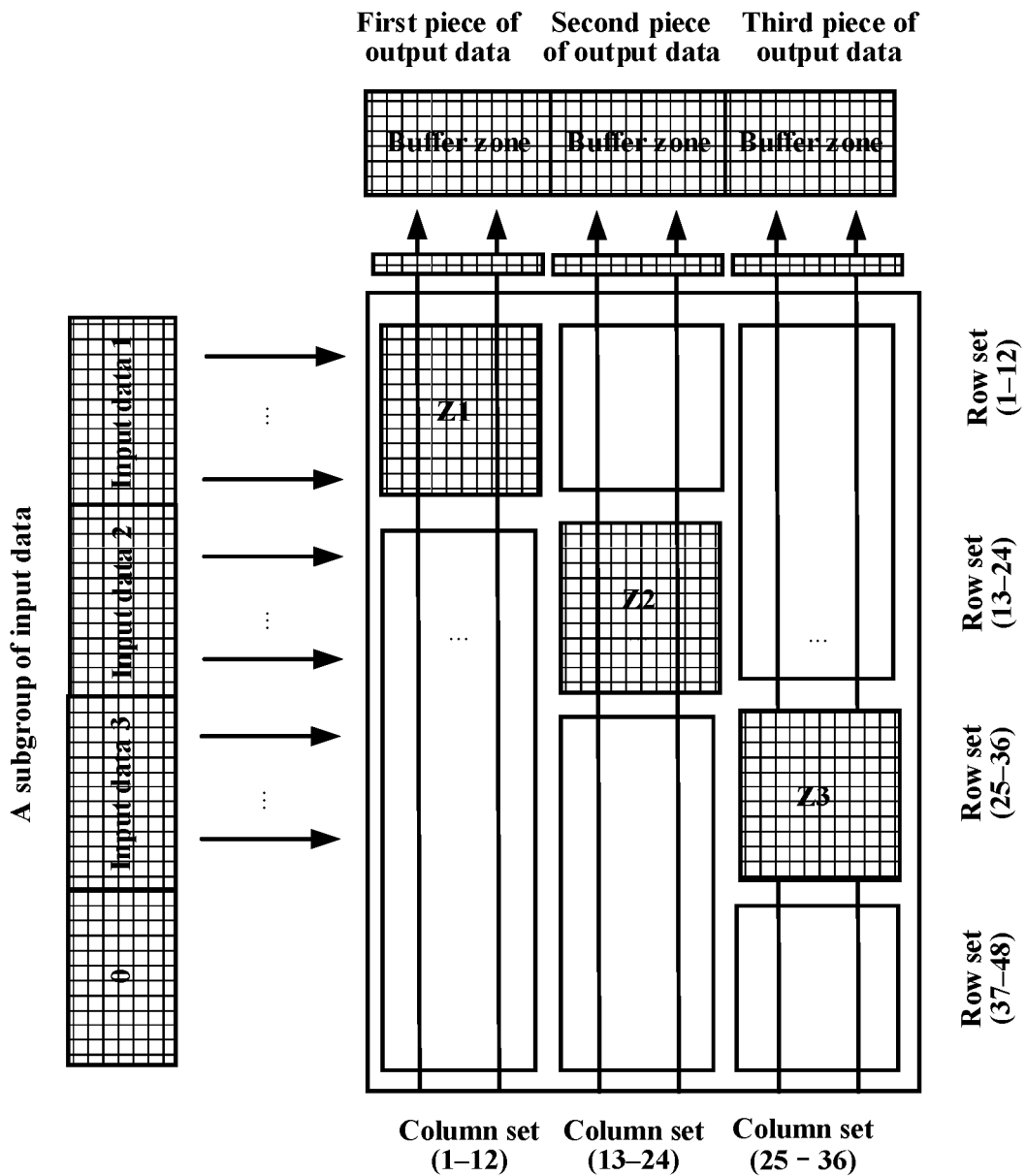

FIG. 10C and FIG. 10D show more details about the data processing method of FIG. 7 in a case that the input splice quantity is greater than the output splice quantity but is not an integer multiple of the output splice quantity. In this case, the comprehensive splice quantity is the output splice quantity, and a quantity of subgroups is 1, that is, a group of generated input data includes only one subgroup.

For example, in a case that the standard input depth and the standard output depth of the systolic array are 48 and 36 respectively and the target input depth and the target output depth of the shallow depth model are both 12, the output splice quantity may be 3, the input splice quantity is 4, and the comprehensive splice quantity is 3. The group of input data and the subgroup of input data include three pieces of input data.

The method of FIG. 7 may further include the following steps, as shown in FIG. 10C.

In step S1010', N pieces of input data complemented with 0 s are added to the group of input data, a value of N being equal to the input splice quantity minus the output splice quantity.

For example, as shown in FIG. 10D, one piece of input data (a depth being 12) is added to match a quantity of rows of the systolic array.

In step S1020', the input buffer provides the group of input data to the systolic array in parallel.

For example, as shown in FIG. 10D, four pieces of input data are provided to the systolic array in parallel.

In step S1030', before calculation is performed on the group of input data, a calculation parameter of a calculation unit corresponding to each piece of input data in the group of input data is set to a valid value, and a calculation parameter of a remaining calculation unit other than the calculation unit corresponding to the input data in the group of input data in the systolic array is set to 0.

For example, as shown in FIG. 10D, row sets corresponding to the group of input data and column sets corresponding to corresponding output data are respectively expressed as follows: a first zone Z1 (1-12, 1-12), a second zone Z2 (13-24, 13-24), and a third zone Z3 (25-36, 25-36). Calculation parameters need to be set for calculation units that are in the row sets and the column sets and that are used for calculation of the group. Calculation parameters of calculation units in zones of the row sets and the column sets are set to valid values, and calculation parameters of remaining calculation units (including calculation units in the 37th to the 48th rows corresponding to added 0 input data) are set to 0.

In step S1040', output data corresponding to each piece of input data in the group of input data is outputted to the output buffer.

For example, as shown in FIG. 10D, because calculation results of the supplemented 0 input data in all the calculation units in the 37th to the 48th rows corresponding to the supplemented 0 input data are 0 and do not affect other calculation results in each column, output data corresponding to three pieces of input data is all buffered to the entire buffer zone or at least some buffer zones of the output buffer, so as to be outputted from the output buffer in batches.

With the data processing method based on a shallow depth model of a systolic array that is described with reference to FIG. 7 to FIG. 10D, in a case that the input splice quantity is greater than 1 and the output splice quantity is greater than 1 (including various cases that the input splice quantity and the output splice quantity are equal or not), a group of input data (input data of the output splice quantity) can be buffered to the input buffer and provided to the systolic array in parallel, and a plurality of pieces of output data that correspond to the group of input data and that are outputted by the systolic array may be buffered to the output buffer and outputted from the output buffer in batches, so that transfer efficiency of the input data and the output data can be improved. In addition, the systolic array may perform calculation for at least two pieces of input data in the group of input data in one calculation process. Compared to the related technology described with reference to FIG. 1 that calculation is performed only for one piece of input data in one calculation process, this improves calculation efficiency and utilization efficiency of calculation units in the systolic array.

According to another aspect of the present disclosure, a calculation apparatus is further provided. An architecture of the calculation apparatus is basically the same as that of the calculation apparatus 100 described with reference to FIG. 1.

As shown in FIG. 1, the calculation apparatus 100 includes a controller 101, a data fetcher 102, a systolic array 103, an input buffer 104, and an output buffer 105.

According to this embodiment of the present disclosure, the controller 101 determines a standard input depth and a standard output depth of the systolic array 103, and determines a target input depth and a target output depth of a shallow depth model. Then the controller 101 determines an input splice quantity for the systolic array based on the target input depth and the standard input depth, and determines an output splice quantity for the systolic array based on the target output depth and the standard output depth, the input splice quantity and/or the output splice quantity being an integer greater than 1. The controller 101 controls the data fetcher 102 to obtain and generate input data matching the input splice quantity, controls batch input of the input data of the input splice quantity to the input buffer of the systolic array 103 in batches with the input data not overlapping each other, controls the input buffer to provide the input data of the input splice quantity to the calculation unit array in parallel, each piece of input data having the target input depth, and controls the systolic array 103 to process the input data in the input buffer to generate output data corresponding to each piece of input data, each piece of output data having the target output depth; and in a case that a quantity of output data received by the output buffer 105 of the systolic array 103 from the systolic array 103 reaches the output splice quantity, controls the output buffer 105 of the systolic array 103 to output the output data matching the output splice quantity in batches with the output data not overlapping each other.

According to this embodiment of the present disclosure, the systolic array 103 may be a calculation unit array, and a quantity of rows and a quantity of columns of the calculation unit array may correspond to (being equal to or greater than) the standard input depth and the standard output depth respectively. A depth of the input buffer 104 corresponds to the standard input depth, and a depth of the output buffer 105 corresponds to (being equal to or greater than) the standard output depth.

According to this embodiment of the present disclosure, in a case that the input splice quantity is equal to 1 and the output splice quantity is greater than 1, the controller 101 controls setting of a calculation parameter (for example, a convolution kernel in a CNN model) for each calculation unit in the calculation unit array, and controls the data fetcher 102 to use input data matching the output splice quantity as a group of input data, output data that corresponds to different input data in the group of input data corresponding to non-overlapping column sets in the calculation unit array 103, and corresponding to non-overlapping buffer zones of the output buffer 105; controls the input buffer 104 to sequentially input the group of input data to the input buffer; and controls the input buffer 104 to sequentially provide the group of input data to the calculation unit array, so that each time the systolic array receives one piece of input data in the group of input data, the systolic array processes the input data according to a calculation parameter in a calculation unit corresponding to the input data to obtain output data corresponding to the input data. For each piece of input data in the group of input data, the controller 101 controls the calculation unit array to output, to a corresponding buffer zone in the output buffer, output data corresponding to the input data. Then, for the group of input data, the controller 101 controls the output buffer 105 to output, in batches, output data matching the output splice quantity in zones of the output buffer 105 with the output data not overlapping each other.

According to this embodiment of the present disclosure, in a case that the input splice quantity is greater than 1 and the output splice quantity is equal to 1, the controller 101 may: control the data fetcher 102 to use the input data matching the input splice quantity as a group of input data, different input data in the group of input data corresponding to non-overlapping row sets in the calculation unit array, and output data that corresponds to different input data in the group of input data all corresponding to all columns in the calculation unit array, and corresponding to an entire buffer zone or at least some buffer zones of the output buffer; control the data fetcher 102 to input the group of input data to the input buffer 104; and control sequential setting, in each calculation unit, of a calculation parameter of each calculation unit required for performing calculation on each piece of input data in the group of input data. The controller 101 controls the systolic array to sequentially perform calculation on each piece of input data in the group of input data, and while performing calculation on each piece of input data, set a calculation parameter of a calculation unit corresponding to the input data to a valid value, and set a calculation parameter of a calculation unit other than the calculation unit corresponding to the input data in the calculation unit array to 0. For example, for each piece of input data, calculation parameters of calculation units in a row set corresponding to the input data are valid values, and calculation parameters of remaining calculation units are 0.

The controller 101 controls the systolic array to sequentially output, to the output buffer, output data corresponding to each piece of input data. For example, the controller 101 controls the input buffer to provide the input data of the input splice quantity to the calculation unit array 103 in parallel; and for the group of input data, controls sequential output of output data corresponding to each piece of input data to the entire buffer zone or at least some buffer zones of the output buffer (according to storage space of the output buffer), to perform sequential output or batch output by using the output buffer (according to the storage space of the output buffer).

According to this embodiment of the present disclosure, in accordance with a determination that the input splice quantity is greater than 1 and the output splice quantity is greater than 1, the controller 101 may: determine a comprehensive splice quantity based on the input splice quantity and the output splice quantity; control the data fetcher 102 to use input data matching the comprehensive splice quantity as a group of input data; and controls the data fetcher 102 to divide the group of input data into at least one subgroup based on the input splice quantity and the output splice quantity, input data in each subgroup corresponding to non-overlapping row sets matching the input splice quantity in the calculation unit array, and output data that corresponds to different input data in the subgroup corresponding to non-overlapping column sets in the calculation unit array, and corresponding to non-overlapping buffer zones of the output buffer 105.

In some implementations, the input splice quantity is greater than 1, the output splice quantity is greater than 1, and the input splice quantity is equal to the output splice quantity. In this case, the comprehensive splice quantity is the input splice quantity or the output splice quantity, a quantity of subgroups is 1, and the controller 101 may further: for a subgroup in the group of input data, control the data fetcher 102 to control the input buffer 104 to provide input data in the subgroup to the calculation unit array 103 in parallel; for calculation of the subgroup, control setting of a calculation parameter of a calculation unit corresponding to each piece of input data in the subgroup of input data to a valid value, and setting of a calculation parameter of a remaining calculation unit other than the calculation unit corresponding to the input data in the calculation unit array 103 to 0; and control the systolic array to output, to the output buffer 105, output data corresponding to each piece of input data in the subgroup, and control the output buffer 105 to output the output data in batches.

In some other implementations, the input splice quantity is an integer multiple, which is greater than 1, of the output splice quantity. In this case, the comprehensive splice quantity is the input splice quantity, a quantity of input data in each subgroup included in the group of input data is the output splice quantity, and the controller 101 may further: control the data fetcher 102 to input, to the input buffer 104, input data of the comprehensive splice quantity, and control the input buffer 104 to provide input data in each subgroup to the calculation unit array 103 in parallel; for calculation of each subgroup, control setting of a calculation parameter of a calculation unit corresponding to each piece of input data in the subgroup to a valid value, and setting of a calculation parameter of a remaining calculation unit other than the calculation unit corresponding to the input data in the subgroup of input data in the calculation unit array to 0; and for the group of input data including the input data of the comprehensive splice quantity, control the calculation unit array 103 to sequentially output, to the output buffer 105, output data corresponding to each subgroup, to perform sequential output or batch output by using the output buffer (according to storage space of the output buffer).

In still some other implementations, the input splice quantity is greater than the output splice quantity but is not an integer multiple of the output splice quantity. In this case, the comprehensive splice quantity is the output splice quantity, a quantity of subgroups is 1, and the controller 101 may further: control the data fetcher 102 to add N pieces of input data complemented with 0 s to the group of input data, a value of N being equal to the input splice quantity minus the output splice quantity; control the data fetcher 102 to input, to the input buffer 104 in batches, the group of input data to which the N pieces of input data are added, and control the input buffer to provide the group of input data to the calculation unit array 103 in parallel; for calculation of the group of input data, control setting of a calculation parameter of a calculation unit corresponding to each piece of input data in the group of input data to a valid value, and setting of a calculation parameter of a remaining calculation unit other than the calculation unit corresponding to the input data in the group of input data in the calculation unit array to 0; and control the calculation unit array 103 to output, to the output buffer 105, output data corresponding to each piece of input data in the group of input data, to perform batch output by using the output buffer 105.

In still some other implementations, the output splice quantity is an integer multiple, which is greater than 1, of the input splice quantity. In this case, the comprehensive splice quantity is the output splice quantity, each subgroup of input data includes input data of the input splice quantity, and the controller 101 may further: for calculation of input data in each subgroup, control the data fetcher 102 to sequentially input, to the input buffer 104 by subgroup, input data of the comprehensive splice quantity, and control the input buffer 104 to provide the input data in each subgroup to the calculation unit array in parallel; for calculation of each subgroup of input data, control setting of a calculation parameter of a calculation unit corresponding to each piece of input data in the subgroup to a valid value, and setting of a calculation parameter of a remaining calculation unit other than the calculation unit corresponding to the input data in the subgroup in the systolic array to 0; and control the calculation unit array 103 to output, to the output buffer 105, output data corresponding to the group of input data (including all subgroups of input data), to perform batch output by using the output buffer 105, during calculation of input data in each subgroup, writing being performed only to a buffer zone that is in the output buffer and that corresponds to output data corresponding to the subgroup of input data, and writing to another buffer zone that corresponds to output data corresponding to a subgroup other than the subgroup being prohibited.

In still some other implementations, in accordance with a determination that the output splice quantity is greater than the input splice quantity but is not an integer multiple of the input splice quantity, the comprehensive splice quantity is the input splice quantity, a quantity of subgroups is 1, and the controller 101 may further: control the data fetcher 102 to input the group of input data to the input buffer 104 in batches, and control the input buffer 104 to provide the group of input data to the calculation unit array in parallel; for calculation of the group of input data, control setting of a calculation parameter of a calculation unit corresponding to each piece of input data in the group of input data to a valid value, and setting of a calculation parameter of a remaining calculation unit other than the calculation unit corresponding to the input data in the group of input data in the calculation unit array to 0; and control the calculation unit array 103 to output, to the output buffer 105, output data corresponding to the group of input data, to perform batch output by using the output buffer, values of at least a part of an entire buffer zone being 0.

For more details about the foregoing operations of the controller 101, refer to the foregoing content described with reference to FIG. 2 to FIG. 10D. Details are not described herein again.

A form of one or more controllers may include a calculation device capable of performing any of the foregoing operations described in this specification. For example, a general purpose processor, a DSP, an ASIC, an FPGA or another programmable logic device, a discrete gate or transistor logic, a discrete hardware component, or any combination thereof implements or performs the operations. The general purpose processor may be a microprocessor, a microcontroller, or the like. The operations described herein may be implemented in hardware, software executed by a processor, firmware, or any combination thereof. When implemented by using software executed by a controller in the form of processor, these operations can be stored in a computer-readable storage medium or can be encoded as one or more instructions or code in a computer-readable medium for transmission.

Therefore, an embodiment of the present disclosure also provides a computer-readable storage medium, storing an instruction or code, the instruction or code, when executed by a processor, implementing the foregoing operations performed by the controller.

The computer-readable storage medium may be a memory including an instruction or code. The code or instruction set may be executed by a controller (processor) to implement all or some steps performed by the controller (including controlling components such as an input buffer and a DSP in a calculation unit) in the calculation apparatus. For example, the computer-readable storage medium may be a ROM, a random access memory (RAM), a CD-ROM, a magnetic tape, a floppy disk, an optical data storage device, or the like.

The flowcharts and block diagrams in the accompanying drawings show architectures, functions, and operations that may be implemented by using the method and apparatus according to the embodiments of the present disclosure. In this regard, each box in the flowchart or the block diagram may represent a module, a program segment, or a part of code. The module, the program segment, or the part of code includes at least one executable instruction used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The exemplary embodiments of the present disclosure described above in detail are merely illustrative and are not to be construed as limited. A person skilled in the art may understand that various modifications and combinations may be made to these embodiments or features thereof without departing from the principle and spirit of this application. These modifications shall fall within the scope of this application.

What is claimed is:

1. A systolic array-based data processing method, comprising:
   determining a standard input depth and a standard output depth of a systolic array, and determining a target input depth and a target output depth of a shallow depth model;
   determining an input splice quantity for the systolic array based on the target input depth and the standard input depth, and determining an output splice quantity for the systolic array based on the target output depth and the standard output depth;
   generating input data matching the input splice quantity, each piece of input data having the target input depth, inputting the input data matching the input splice quantity to an input buffer of the systolic array in batches, without overlaps in the input data, and processing, by the systolic array, the input data in the input buffer to generate output data corresponding to each piece of input data, each piece of output data having the target output depth; and
   in accordance with a determination that a quantity of output data received by an output buffer of the systolic array from the systolic array matches the output splice quantity, outputting, in the output buffer, output data having a quantity matching the output splice quantity in batches.

2. The data processing method according to claim 1, wherein determining the input splice quantity and determining the output splice quantity comprises:
   setting an integer part of a ratio of the standard input depth to the target input depth as the input splice quantity; and
   setting an integer part of a ratio of the standard output depth to the target output depth as the output splice quantity, wherein at least one of the input splice quantity and the output splice quantity is an integer greater than 1.

3. The data processing method according to claim 1, wherein the systolic array is a calculation unit array, and a number of rows and a number of columns of the calculation unit array correspond to the standard input depth and the standard output depth, respectively; and
   a depth of the input buffer corresponds to the standard input depth, and a depth of the output buffer corresponds to the standard output depth.

4. The data processing method according to claim 1, wherein the input splice quantity is equal to 1, and the output splice quantity is greater than 1; and inputting the input data matching the input splice quantity to an input buffer of the systolic array in batches, without overlaps in the input data, and processing the input data in the input buffer comprises:
   setting a calculation parameter for each calculation unit in the systolic array;
   using input data having the output splice quantity as a group of input data to output data associated with different input data in the group of input data corresponding to non-overlapping column sets in the systolic array, and wherein the output data corresponds to non-overlapping buffer zones of the output buffer;
   sequentially providing, by the input buffer, the group of input data to the systolic array, wherein the systolic array receives one piece of input data in the group of input data and the systolic array processes the input data according to a calculation parameter in a calculation unit corresponding to the input data to obtain output data corresponding to the input data; and
   for each piece of input data in the group of input data, outputting output data corresponding to the input data to a buffer zone corresponding to the output data; and
   wherein outputting the output data matching the output splice quantity in the output buffer in batches comprises:
   for the group of input data, outputting, by the output buffer, non-overlapping output data matching the output splice quantity in buffer zones of the output buffer in batches.

5. The data processing method according to claim 4, wherein for each piece of input data in the group of input data, outputting output data corresponding to the input data to a buffer zone corresponding to the output data comprises:
   during calculation of each piece of input data, prohibiting writing to a buffer zone that corresponds to output data corresponding to input data other than the input data on which calculation is performed in the group of input data.

6. The data processing method according to claim 1, wherein the input splice quantity is greater than 1, and the output splice quantity is equal to 1; and inputting the input data matching the input splice quantity to an input buffer of the systolic array in batches, without overlaps in the input data, and processing, the input data in the input comprises:
   using the input data having the input splice quantity as a group of input data, different input data in the group of input data corresponding to non-overlapping row sets in the systolic array, and output data that corresponds to different input data in the group of input data all corresponding to all columns in the systolic array;
   providing, by the input buffer, the group of input data to the systolic array in parallel;
   sequentially performing calculation on each piece of input data in the group of input data, and while performing calculation on each piece of input data, setting a calculation parameter of a calculation unit corresponding to the input data to a valid value, and setting a calculation parameter of a calculation unit other than the calculation unit corresponding to the input data in the systolic array to 0; and
   sequentially outputting output data corresponding to each piece of input data to the output buffer.

7. The data processing method according to claim 1, wherein both the input splice quantity and the output splice quantity are greater than 1; and inputting the input data matching the input splice quantity, and processing, by the systolic array, the input data in the input buffer to generate output data comprises:
   determining a comprehensive splice quantity based on the input splice quantity and the output splice quantity;

using input data matching the comprehensive splice quantity as a group of input data; and dividing the group of input data into at least one subgroup based on the input splice quantity and the output splice quantity, wherein input data in each subgroup corresponds to non-overlapping row sets matching the input splice quantity in the systolic array, and output data that corresponds to different input data in the subgroup corresponding to non-overlapping column sets in the systolic array and corresponding to non-overlapping buffer zones of the output buffer.

8. The data processing method according to claim 7, wherein in accordance with a determination that the input splice quantity matches the output splice quantity, setting the input splice quantity as the comprehensive splice quantity, and a quantity of subgroups in the group of input data is 1; and inputting the input data matching the input splice quantity to an input buffer of the systolic array in batches, and processing, by the systolic array, the input data in the input buffer to generate output data corresponding to each piece of input data further comprises:

for a subgroup in the group of input data, providing, by the input buffer, input data in the subgroup to the systolic array in parallel;

for calculation of the subgroup, setting a calculation parameter of a calculation unit corresponding to each piece of input data in the subgroup of input data to a valid value, and setting a calculation parameter of a remaining calculation unit other than the calculation unit corresponding to the input data in the systolic array to 0; and outputting output data corresponding to each piece of input data in the subgroup to the output buffer.

9. The data processing method according to claim 7, in accordance with a determination that the input splice quantity is an integer multiple greater than 1, of the output splice quantity, the comprehensive splice quantity is the input splice quantity, and a quantity of input data in each subgroup in the group of input data is the output splice quantity; and the inputting the input data matching the input splice quantity to an input buffer of the systolic array in batches with the input data not overlapping each other, and processing, by the systolic array, the input data in the input buffer to generate output data corresponding to each piece of input data further comprises:

providing, by the input buffer, input data in each subgroup to the systolic array in parallel;

for calculation of each subgroup, setting a calculation parameter of a calculation unit corresponding to each piece of input data in the subgroup to a valid value, and setting a calculation parameter of a remaining calculation unit other than the calculation unit corresponding to the input data in the subgroup of input data in the systolic array to 0; and sequentially outputting output data corresponding to each subgroup to the output buffer.

10. The data processing method according to claim 7, wherein in accordance with a determination that the input splice quantity is greater than the output splice quantity but is not an integer multiple of the output splice quantity, the comprehensive splice quantity is the output splice quantity, and a quantity of subgroups comprised in the group of input data is 1; and the inputting the input data matching the input splice quantity to an input buffer of the systolic array in batches with the input data not overlapping each other, and processing, by the systolic array, the input data in the input buffer to generate output data corresponding to each piece of input data further comprises:

adding N pieces of input data complemented with 0 s to the group of input data, a value of N being equal to the input splice quantity minus the output splice quantity;

providing, by the input buffer, the group of input data to the systolic array in parallel;

for calculation of the group of input data, setting a calculation parameter of a calculation unit corresponding to each piece of input data in the group of input data to a valid value, and setting a calculation parameter of a remaining calculation unit other than the calculation unit corresponding to the input data in the group of input data in the systolic array to 0; and outputting output data corresponding to each piece of input data in the group of input data to the output buffer.

11. The data processing method according to claim 7, wherein in accordance with a determination that the output splice quantity is an integer multiple, which is greater than 1, of the input splice quantity, the comprehensive splice quantity is the output splice quantity, and each subgroup of input data comprises input data of the input splice quantity; and the inputting the input data matching the input splice quantity to an input buffer of the systolic array in batches with the input data not overlapping each other, and processing, by the systolic array, the input data in the input buffer to generate output data corresponding to each piece of input data further comprises:

for calculation of input data in each subgroup, providing, by the input buffer, the input data in the subgroup to the systolic array in parallel;

setting a calculation parameter of a calculation unit corresponding to each piece of input data in the subgroup to a valid value, and setting a calculation parameter of a remaining calculation unit other than the calculation unit corresponding to the input data in the subgroup in the systolic array to 0; and outputting output data corresponding to the group of input data to the output buffer;

during calculation of input data in each subgroup, writing being performed only to a buffer zone that corresponds to output data corresponding to the subgroup, and writing to a buffer zone that corresponds to output data corresponding to a subgroup other than the subgroup being prohibited.

12. The data processing method according to claim 7, wherein in accordance with a determination that the output splice quantity is greater than the input splice quantity but is not an integer multiple of the input splice quantity, the comprehensive splice quantity is the input splice quantity, and a quantity of subgroups is 1; and the inputting the input data matching the input splice quantity to an input buffer of the systolic array in batches with the input data not overlapping each other, and processing, by the systolic array, the input data in the input buffer to generate output data corresponding to each piece of input data further comprises:

providing, by the input buffer, the group of input data to the systolic array in parallel;

for calculation of the group of input data, setting a calculation parameter of a calculation unit corresponding to each piece of input data in the group of input data to a valid value, and setting a calculation parameter of a remaining calculation unit other than the calculation unit corresponding to the input data in the group of input data in the systolic array to 0; and outputting output data corresponding to the group of input data to the output buffer.

13. An electronic device, comprising:
one or more processors; and
memory storing one or more programs, the one or more programs comprising instructions that, when executed by the one or more processors, cause the one or more processors to perform operations comprising:
determining a standard input depth and a standard output depth of a systolic array, and determining a target input depth and a target output depth of a shallow depth model;
determining an input splice quantity for the systolic array based on the target input depth and the standard input depth, and determining an output splice quantity for the systolic array based on the target output depth and the standard output depth;
generating input data matching the input splice quantity, each piece of input data having the target input depth, inputting the input data matching the input splice quantity to an input buffer of the systolic array in batches, without overlaps in the input data, and processing, by the systolic array, the input data in the input buffer to generate output data corresponding to each piece of input data, each piece of output data having the target output depth; and
in accordance with a determination that a quantity of output data received by an output buffer of the systolic array from the systolic array matches the output splice quantity, outputting, in the output buffer, output data having a quantity matching the output splice quantity in batches.

14. The electronic device of claim 13, wherein determining the input splice quantity and determining the output splice quantity comprises:
setting an integer part of a ratio of the standard input depth to the target input depth as the input splice quantity; and
setting an integer part of a ratio of the standard output depth to the target output depth as the output splice quantity, wherein at least one of the input splice quantity and the output splice quantity is an integer greater than 1.

15. The electronic device of claim 13, wherein the systolic array is a calculation unit array, and a number of rows and a number of columns of the calculation unit array correspond to the standard input depth and the standard output depth, respectively; and
a depth of the input buffer corresponds to the standard input depth, and a depth of the output buffer corresponds to the standard output depth.

16. The electronic device of claim 13, wherein the input splice quantity is equal to 1, and the output splice quantity is greater than 1; and inputting the input data matching the input splice quantity to an input buffer of the systolic array in batches, without overlaps in the input data, and processing the input data in the input buffer comprises:
setting a calculation parameter for each calculation unit in the systolic array;
using input data having the output splice quantity as a group of input data to output data associated with different input data in the group of input data corresponding to non-overlapping column sets in the systolic array, and wherein the output data corresponds to non-overlapping buffer zones of the output buffer;
sequentially providing, by the input buffer, the group of input data to the systolic array, wherein the systolic array receives one piece of input data in the group of input data and the systolic array processes the input data according to a calculation parameter in a calculation unit corresponding to the input data to obtain output data corresponding to the input data; and
for each piece of input data in the group of input data, outputting output data corresponding to the input data to a buffer zone corresponding to the output data; and
wherein outputting the output data matching the output splice quantity in the output buffer in batches comprises:
for the group of input data, outputting, by the output buffer, non-overlapping output data matching the output splice quantity in buffer zones of the output buffer in batches.

17. The electronic device of claim 16, wherein for each piece of input data in the group of input data, outputting output data corresponding to the input data to a buffer zone corresponding to the output data comprises:
during calculation of each piece of input data, prohibiting writing to a buffer zone that corresponds to output data corresponding to input data other than the input data on which calculation is performed in the group of input data.

18. The electronic device of claim 13, wherein the input splice quantity is greater than 1, and the output splice quantity is equal to 1; and inputting the input data matching the input splice quantity to an input buffer of the systolic array in batches, without overlaps in the input data, and processing, the input data in the input comprises:
using the input data having the input splice quantity as a group of input data, different input data in the group of input data corresponding to non-overlapping row sets in the systolic array, and output data that corresponds to different input data in the group of input data all corresponding to all columns in the systolic array;
providing, by the input buffer, the group of input data to the systolic array in parallel;
sequentially performing calculation on each piece of input data in the group of input data, and while performing calculation on each piece of input data, setting a calculation parameter of a calculation unit corresponding to the input data to a valid value, and setting a calculation parameter of a calculation unit other than the calculation unit corresponding to the input data in the systolic array to 0; and
sequentially outputting output data corresponding to each piece of input data to the output buffer.

19. A non-transitory computer-readable storage medium, storing a computer program, the computer program, when executed by one or more processors of an electronic device, cause the one or more processors to perform operations comprising:
determining a standard input depth and a standard output depth of a systolic array, and determining a target input depth and a target output depth of a shallow depth model;
determining an input splice quantity for the systolic array based on the target input depth and the standard input depth, and determining an output splice quantity for the systolic array based on the target output depth and the standard output depth;
generating input data matching the input splice quantity, each piece of input data having the target input depth, inputting the input data matching the input splice quantity to an input buffer of the systolic array in batches, without overlaps in the input data, and processing, by the systolic array, the input data in the input buffer to generate output data corresponding to each piece of input data, each piece of output data having the target output depth; and in accordance with a determination that a quantity of output data received by an output buffer of the systolic array from the systolic array matches the output splice quantity, outputting, in the output buffer, output data having a quantity matching the output splice quantity in batches.

20. The non-transitory computer-readable storage medium of claim 19, wherein determining the input splice quantity and determining the output splice quantity comprises:

setting an integer part of a ratio of the standard input depth to the target input depth as the input splice quantity; and setting an integer part of a ratio of the standard output depth to the target output depth as the output splice quantity, wherein at least one of the input splice quantity and the output splice quantity is an integer greater than 1.

\* \* \* \* \*